United States Patent
Jiang et al.

(10) Patent No.: US 12,362,878 B2
(45) Date of Patent: Jul. 15, 2025

(54) METHOD AND DEVICE IN NODES USED FOR WIRELESS COMMUNICATION

(71) Applicant: BUNKER HILL TECHNOLOGIES LLC, Allen, TX (US)

(72) Inventors: Qi Jiang, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 705 days.

(21) Appl. No.: 17/672,724

(22) Filed: Feb. 16, 2022

(65) Prior Publication Data
US 2022/0173860 A1    Jun. 2, 2022

Related U.S. Application Data

(63) Continuation of application No. PCT/CN2020/108649, filed on Aug. 12, 2020.

(30) Foreign Application Priority Data

Aug. 23, 2019    (CN) .......................... 201910781459.2

(51) Int. Cl.
*H04W 4/00*    (2018.01)
*H04L 5/00*    (2006.01)
*H04W 4/40*    (2018.01)

(52) U.S. Cl.
CPC .......... *H04L 5/0048* (2013.01); *H04L 5/0055* (2013.01); *H04W 4/40* (2018.02)

(58) Field of Classification Search
CPC ..... H04W 72/04; H04W 72/12; H04W 72/40; H04W 72/50; H04W 4/40; H04W 4/46; H04L 5/003; H04L 5/0053
See application file for complete search history.

(56) References Cited

U.S. PATENT DOCUMENTS 10,694,460 B2 *    6/2020    Ingale ................. H04W 68/005
2016/0135143 A1    5/2016    Won
(Continued)

FOREIGN PATENT DOCUMENTS

CN    109245869 A    1/2019
CN    109792370 A    5/2019
(Continued)

OTHER PUBLICATIONS

ISR received in application No. PCT/CN2020/108649 dated Nov. 13, 2020.
(Continued)

*Primary Examiner* — Shantell L Heiber
(74) *Attorney, Agent, or Firm* — Ascenda Law Group, PC

(57) ABSTRACT

The present disclosure provides a method and device in nodes for wireless communication. A first node firstly receives a first signaling, the first signaling being used to indicate a first zone identifier; and then determines whether a first signal is transmitted according to the first zone identifier and a target zone identifier; when the determination result is yes, the first signal is transmitted in a first radio resource set; when the determination result is no, the first signal transmission is cancelled in the first radio resource set; when the first signal is associated with a first reference signal. The present disclosure optimizes determination upon sidelink feedback information transmission by respectively associating the first reference signal and the second reference signal with the second zone identifier and the third zone identifier, thus the spectrum efficiency of sidelink transmission can be improved.

17 Claims, 6 Drawing Sheets

(56) References Cited

U.S. PATENT DOCUMENTS

2017/0353971 A1* 12/2017 Gupta ................... H04W 74/04
2019/0349938 A1* 11/2019 Chen ..................... H04W 64/00

FOREIGN PATENT DOCUMENTS

CN       110100496  A    8/2019
WO     2019027304  A1    2/2019

OTHER PUBLICATIONS

CN201910781459.2 First Office Action dated Feb. 7, 2022.
CN201910781459.2 First Search Report dated Jan. 26, 2022.
CN201910781459.2 Notification to Grant Patent Right for Invention dated Jun. 6, 2022.
CATT "DiscussiononphysicallayerproceduresinNRV2X" 3GPPTSGRAN1Meeting#95 R1-1812618,Nov. 3, 2018.
"Status Report of WI on New Radio Access Technology; rapporteur: NTI OOCOMO" 3GPP TSG RAN RP-171137, May 29, 2017.
Huawei,HiSilicon"SidelinkphysicallayerproceduresforNRV2X"3GPPTSGRANWG1Meeting#96biS R1-1903944,Apr. 2, 2019.
LGElectronics "Featureleadsummaryforagendaitem7.2.4.5Physicallayerproceduresforsidelink" 3GPPTSGRANWG1#97 R1-1907682 May 16, 2019.

* cited by examiner

METHOD AND DEVICE IN NODES USED FOR WIRELESS COMMUNICATION

CROSS REFERENCE TO RELATED APPLICATIONS

This application is the continuation of International Patent Application No. PCT/CN2020/108649, filed on Aug. 12, 2020, which claims the priority benefit of Chinese Patent Application No. 201910781459.2, filed on Aug. 23, 2019, the full disclosure of which is incorporated herein by reference.

BACKGROUND

Technical Field

The present disclosure relates to transmission methods and devices in wireless communication systems, and in particular to a sidelink-related transmission method and device in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffics, the 3GPP started its work of standards setting and studies around the NR framework. At present, the 3GPP has finished regulations of requirements targeting the 5G V2X traffics which are included in the TS 22.886. The 3GPP defined 4 typical Use Case Groups for the 5G V2X traffics, which are as follows: Vehicles Platooning, Extended Sensors, Advanced Driving and Remote Driving. And a study of V2X technologies based on NR was already initiated by the 3GPP at the RAN #80 Plenary.

SUMMARY

Compared with the existing Long-term Evolution (LTE) V2X system, NR V2X has a significant character of supporting both unicast and groupcast as well as Hybrid Automatic Repeat reQuest (HARQ) functions. The Physical Sidelink Feedback Channel (PSFCH) is introduced for a HARQ-Acknowledgement (HARQ-ACK) transmission in sidelink. According to conclusions drawn at the 3GPP RAN1 #96b conference, PSFCH resources can be periodically configured or pre-configured.

During the 3GPP RAN1 #97 Plenary, for a Groupcast HARQ-ACK, a receiving User Equipment (UE) in V2X determines whether it is necessary to send a HARQ feedback by determining its distance to a transmitting UE in V2X, thus preventing unneeded overhead of feedback channel in the sidelink in an effective way. In V2X application scenarios of the future, a terminal will be configured with multiple panels, and these panels can adopt different beamforming vectors for transmission or reception to improve the system performance. When the multiple panels are distant from one another, or when they correspond to different beamforming vectors, the above-mentioned scheme of determining the way of transmitting sidelink HARQs depending on positional information shall be redesigned in the multi-TRP scenario.

To address the above problem, the present disclosure provides a solution. It should be noted that in the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

The present disclosure provides a method in a first node for wireless communications, comprising:
  receiving a first signaling, the first signaling being used to indicate a first zone identifier;
  determining whether to transmit a first signal according to the first zone identifier and a target zone identifier; when the determination result is yes, transmits a first signal in a first radio resource set; when the determination result is no, drops a first signal transmission in a first radio resource set;
  herein, when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, an advantage of the above method is that: when a first node is configured with two panels, and these panels are distant from each other, the first node determines a second zone identifier and a third zone identifier respectively for actual locations of the panels so that the first node can acquire more correct zone identifier information depending on the actual position of an employed antenna port when determining whether a HARQ-ACK is transmitted, thus ensuring the preciseness of the determining process.

In one embodiment, another advantage of the above method is that: the second zone identifier and the third zone identifier are respectively for different beamforming vectors, and the second zone identifier and the third zone identifier are respectively obtained through calculation based on different zone sizes, to ensure that a different zone size and zone identifier can be adopted on each beam, thus making the determination about HARQ-ACK transmission a beam-specific one, which is more flexible and efficient, as well as avoiding intra-beam interferences.

According to one aspect of the present disclosure, the above method is characterized in comprising:
  transmitting the first reference signal and the second reference signal.

In one embodiment, an advantage of the above method is that: the first node transmits the first reference signal and the second reference signal, and then tells a second node in the present disclosure which beamforming vector is to be adopted to receive the first signal, thus ensuring the first signal reception performance.

According to one aspect of the present disclosure, the above method is characterized in comprising:
  receiving the first reference signal and the second reference signal.

In one embodiment, an advantage of the above method is that: the second node in the present disclosure transmits the first reference signal and the second reference signal, and then tells a first node in the present disclosure which candidate beamforming vectors are to be adopted to transmit the first signal, thus ensuring that the first signal can be received by the second node.

According to one aspect of the present disclosure, the above method is characterized in comprising:
receiving first information;
herein, the first information is used to indicate that the first signal is associated with the first reference signal, or the first information is used to indicate that the first signal is associated with the second reference signal.

In one embodiment, an advantage of the above method is that: a second node in the present disclosure indicates to the first node by the first information which beamforming vector is to be adopted to transmit the first signal, thus ensuring the reception performance of the first signal.

According to one aspect of the present disclosure, the above method is characterized in that the second zone identifier and a first offset are used to determine the third zone identifier, the first offset relating to a distance between a first panel and a second panel; a first antenna port and a second antenna port are respectively associated with the first panel and the second panel.

In one embodiment, an advantage of the above method is that: the first offset is used to determine a distance between the first panel and the second panel; Thus it can be guaranteed that when adopting different panels for transmitting the first signal, different zone identifiers for different panels referred to can truthfully reflect respective locations of the panels, thus ensuring the preciseness of the process of determining whether a sidelink HARQ-ACK is to be transmitted.

In one embodiment, another advantage of the above method is that: when the first node is of a larger size and configured with the first panel and the second panel, the first panel and the second panel are distant from each other, which means that they will be respectively located in two different zones, hence the need to determine whether it is necessary to send the first signal respectively based on the zones where the first panel and the second panel are located, for higher accuracy of decision.

According to one aspect of the present disclosure, the above method is characterized in comprising:
receiving a second signaling;
herein, the second signaling is used to indicate the first offset.

According to one aspect of the present disclosure, the above method is characterized in comprising:
receiving a target signal;
herein, the first signaling comprises configuration information for the target signal, the first signal being used for feedback for the target signal; the target signal is transmitted in a sidelink.

According to one aspect of the present disclosure, the above method is characterized in comprising:
receiving a third signaling;
herein, the third signaling is used to indicate a first zone size, the first zone size being used to determine a first zone identifier;

According to one aspect of the present disclosure, the above method is characterized in that the first zone size is used to determine at least the second zone identifier of the second zone identifier and the third zone identifier.

According to one aspect of the present disclosure, the above method is characterized in that the third signaling is used to indicate a second zone size, the second zone size being used to determine the third zone identifier.

The present disclosure provides a method in a second node for wireless communications, comprising:
transmitting a first signaling, the first signaling being used to indicate a first zone identifier;
and detecting a first signal in a first radio resource set;
herein, a transmitter for the first signal includes a first node, the first node determines whether to transmit a first signal according to the first zone identifier and a target zone identifier; when the determination result is yes, the first node transmits a first signal in a first radio resource set; if the determination result is no, the first node drops transmitting a first signal in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

According to one aspect of the present disclosure, the above method is characterized in comprising:
receiving the first reference signal and the second reference signal.

According to one aspect of the present disclosure, the above method is characterized in comprising:
transmitting the first reference signal and the second reference signal.

According to one aspect of the present disclosure, the above method is characterized in comprising:
transmitting first information;
herein, the first information is used to indicate that the first signal is associated with the first reference signal, or the first information is used to indicate that the first signal is associated with the second reference signal.

According to one aspect of the present disclosure, the above method is characterized in that the second zone identifier and a first offset are used to determine the third zone identifier, the first offset relating to a distance between a first panel and a second panel; a first antenna port and a second antenna port are respectively associated with the first panel and the second panel.

According to one aspect of the present disclosure, the above method is characterized in comprising:
transmitting a second signaling;
herein, the second signaling is used to indicate the first offset.

According to one aspect of the present disclosure, the above method is characterized in comprising:
transmitting a target signal;
herein, the first signaling comprises configuration information for the target signal, the first signal being used for feedback for the target signal; the target signal is transmitted in a sidelink.

According to one aspect of the present disclosure, the above method is characterized in comprising:
receiving a third signaling;
herein, the third signaling is used to indicate a first zone size, the first zone size being used to determine a first zone identifier;

According to one aspect of the present disclosure, the above method is characterized in that the first zone size is used to determine at least the second zone identifier of the second zone identifier and the third zone identifier.

According to one aspect of the present disclosure, the above method is characterized in that the third signaling is used to indicate a second zone size, the second zone size being used to determine the third zone identifier.

The present disclosure provides a method in a third node for wireless communications, comprising:

transmitting a third signaling;

herein, the third signaling is used to indicate a first zone size, the first zone size being used to determine a first zone identifier; a receiver for the third signaling includes at least a first node of the first node and a second node. the first node receives a first signaling, the first signaling being used to indicate the first zone identifier; the first node determines whether to transmit a first signal according to the first zone identifier and a target zone identifier; when the determination result is yes, transmits a first signal in a first radio resource set; when the determination result is no, drops a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier; the first zone size is used to determine at least the second zone identifier of the second zone identifier and the third zone identifier.

According to one aspect of the present disclosure, the above method is characterized in that the third signaling is used to indicate a second zone size, the second zone size being used to determine the third zone identifier.

The present disclosure provides a first node for wireless communications, comprising:

a first receiver, receiving a first signaling, the first signaling being used to indicate a first zone identifier; and a first transmitter, determining whether to transmit a first signal according to the first zone identifier and a target zone identifier; when the determination result is yes, transmitting a first signal in a first radio resource set; when the determination result is no, dropping a first signal transmission in a first radio resource set;

herein, when the first signal is associated with a first reference signal, the target zone identifier is a second zone identifier; when the first signal is associated with a second reference signal, the target zone identifier is a third zone identifier; the second zone identifier is different from the third zone identifier.

The present disclosure provides a second node for wireless communications, comprising:

a second transmitter, transmitting a first signaling, the first signaling being used to indicate a first zone identifier; and a second receiver, detecting a first signal in a first radio resource set;

herein, a transmitter for the first signal includes a first node, the first node determines whether to transmit a first signal according to the first zone identifier and a target zone identifier; when the determination result is yes, the first node transmits a first signal in a first radio resource set; if the determination result is no, the first node drops transmitting a first signal in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

The present disclosure provides a third node for wireless communications, comprising:

a third transmitter, transmitting a third signaling;

herein, the third signaling is used to indicate a first zone size, the first zone size being used to determine a first zone identifier; a receiver for the third signaling includes at least a first node of the first node and a second node. the first node receives a first signaling, the first signaling being used to indicate the first zone identifier; the first node determines whether to transmit a first signal according to the first zone identifier and a target zone identifier; when the determination result is yes, transmits a first signal in a first radio resource set; when the determination result is no, drops a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier; the first zone size is used to determine at least the second zone identifier of the second zone identifier and the third zone identifier.

In one embodiment, compared with the prior art, the present disclosure is advantageous in the following aspects:

when a first node is configured with two panels, and these panels are distant from each other, the first node determines a second zone identifier and a third zone identifier respectively for actual locations of the panels so that the first node can acquire more correct zone identifier information depending on the actual position of an employed antenna port when determining whether a HARQ-ACK is transmitted, thus ensuring the preciseness of the determining process;

the second zone identifier and the third zone identifier are respectively for different beamforming vectors, and the second zone identifier and the third zone identifier are respectively obtained through calculation based on different zone sizes, to ensure that a different zone size and zone identifier can be adopted on each beam, thus making the determination about HARQ-ACK transmission a beam-specific one, which is more flexible and efficient, as well as avoiding intra-beam interferences;

by transmitting the first reference signal and the second reference signal, it can be further determined which beamforming vector is to be adopted for receiving or transmitting the first signal, thus guaranteeing the first signal reception performance;

the first offset is used to determine a distance between the first panel and the second panel; thus it can be guaranteed that when adopting different panels for transmitting the first signal, different zone identifiers for different panels referred to can truthfully reflect respective locations of the panels, thus ensuring the preciseness of the process of determining whether a sidelink HARQ-ACK is to be transmitted.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
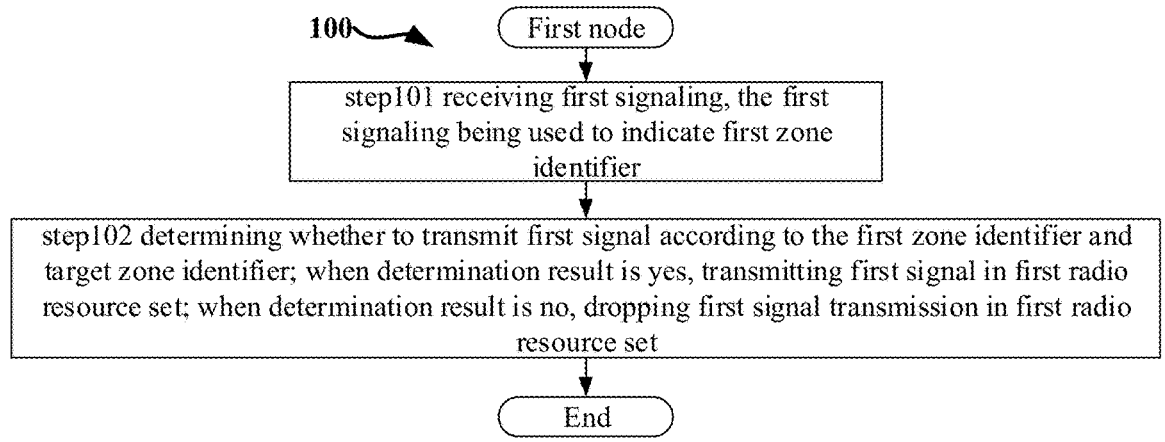
FIG. 1 illustrates a flowchart of processing of a first node according to one embodiment of the present disclosure.

Embodiment 1 illustrates a flowchart of processing of a first node, as shown in FIG. 1. In 100 illustrated by FIG. 1, each box represents a step. In Embodiment 1, a first node in the present disclosure receives a first signaling in step 101, the first signaling being used to indicate a first zone identifier; and determines whether to transmit a first signal according to the first zone identifier and a target zone identifier in step 102; when the determination result is yes, transmits a first signal in a first radio resource set; when the determination result is no, drops a first signal transmission in a first radio resource set.

In Embodiment 1, when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, whether the first signal is associated with the first reference signal or the second reference signal is unrelated to a target receiver for the first signal.

In one embodiment, whether the first signal is associated with the first reference signal or the second reference signal is unrelated to a spatial receive parameter group adopted by the second node in the present disclosure for receiving the first signal.

In one embodiment, the second node in the present disclosure is able to receive the first signal, no matter whether the first signal is associated with the first reference signal or with the second reference signal.

In one embodiment, time-domain resources occupied by the first reference signal and time-domain resources occupied by the second reference signal are orthogonal (that is, non-overlapping).

In one embodiment, there isn't a multicarrier symbol that belongs to both time-domain resources occupied by the first reference signal and time-domain resources occupied by the second reference signal.

In one embodiment, the above-mentioned phrase that the first signal is associated with a first reference signal comprises a meaning that: the first signal and the first reference signal are Quasi co-located (QCL).

In one embodiment, the above-mentioned phrase that the first signal is associated with a first reference signal comprises a meaning that: all or partial large-scale properties of the first reference signal can be used to infer all or partial large-scale properties of the first signal. the large-scale properties include: one or more of Delay Spread, Doppler Spread, Doppler Shift, Path Loss or Average Gain.

In one embodiment, the above-mentioned phrase that the first signal is associated with a first reference signal comprises a meaning that: a spatial receive parameter group for the first signal can be determined from a spatial transmission parameter group for the first reference signal.

In one embodiment, the above-mentioned phrase that the first signal is associated with a first reference signal comprises a meaning that: a reception beamforming vector of the first signal can be determined from a transmission beamforming vector of the first reference signal.

In one embodiment, the above-mentioned phrase that the first signal is associated with a first reference signal comprises a meaning that: a spatial receive parameter group for the first signal can be determined from a spatial receive parameter group for the first reference signal.

In one embodiment, the above-mentioned phrase that the first signal is associated with a first reference signal comprises a meaning that: a reception beamforming vector of the first signal can be determined from a reception beamforming vector of the first reference signal.

In one subembodiment of the above four embodiments, the above operation is done in the second node.

In one embodiment, the above-mentioned phrase that the first signal is associated with a first reference signal comprises a meaning that: a spatial transmission parameter group for the first signal can be determined from a spatial receive parameter group for the first reference signal.

In one embodiment, the above-mentioned phrase that the first signal is associated with a first reference signal comprises a meaning that: a transmission beamforming vector of the first signal can be determined from a reception beamforming vector of the first reference signal.

In one embodiment, the above-mentioned phrase that the first signal is associated with a first reference signal comprises a meaning that: a spatial transmission parameter group for the first signal can be determined from a spatial transmission parameter group for the first reference signal.

In one embodiment, the above-mentioned phrase that the first signal is associated with a first reference signal comprises a meaning that: a transmission beamforming vector of the first signal can be determined from a transmission beamforming vector of the first reference signal.

In one subembodiment of the above four embodiments, the above operation is done in the first node.

In one embodiment, the above-mentioned phrase that the first signal is associated with a second reference signal comprises a meaning that: a spatial receive parameter group for the first signal can be determined from a spatial transmission parameter group for the second reference signal.

In one embodiment, the above-mentioned phrase that the first signal is associated with a second reference signal comprises a meaning that: a reception beamforming vector of the first signal can be determined from a transmission beamforming vector of the second reference signal.

In one embodiment, the above-mentioned phrase that the first signal is associated with a second reference signal comprises a meaning that: a spatial receive parameter group for the first signal can be determined from a spatial receive parameter group for the second reference signal.

In one embodiment, the above-mentioned phrase that the first signal is associated with a second reference signal comprises a meaning that: a reception beamforming vector of the first signal can be determined from a reception beamforming vector of the second reference signal.

In one subembodiment of the above four embodiments, the above operation is done in the second node.

In one embodiment, the above-mentioned phrase that the first signal is associated with a second reference signal comprises a meaning that: a spatial transmission parameter group for the first signal can be determined from a spatial receive parameter group for the second reference signal.

In one embodiment, the above-mentioned phrase that the first signal is associated with a second reference signal comprises a meaning that: a transmission beamforming vector of the first signal can be determined from a reception beamforming vector of the second reference signal.

In one embodiment, the above-mentioned phrase that the first signal is associated with a second reference signal comprises a meaning that: a spatial transmission parameter group for the first signal can be determined from a spatial transmission parameter group for the second reference signal.

In one embodiment, the above-mentioned phrase that the first signal is associated with a second reference signal comprises a meaning that: a transmission beamforming vector of the first signal can be determined from a transmission beamforming vector of the second reference signal.

In one subembodiment of the above four embodiments, the above operation is done in the first node.

In one embodiment, the above-mentioned phrase that the first signal is associated with a first reference signal comprises a meaning that: the first signal is transmitted in a first radio resource pool, and the first reference signal is associated with the first radio resource pool, the first radio resource pool comprising the first radio resource set.

In one embodiment, the above-mentioned phrase that the first signal is associated with a second reference signal comprises a meaning that: the first signal is transmitted in a second radio resource pool, and the first reference signal is associated with the second radio resource pool, the second radio resource pool comprising the first radio resource set.

In one embodiment, the first radio resource pool in the present disclosure comprises M1 radio resource set(s), while the second radio resource pool in the present disclosure comprises M2 radio resource set(s), where M1 and M2 are both positive integers.

In one subembodiment, any of the M1 radio resource set(s) occupies a positive integer number of multicarrier symbol(s) in time domain, and a positive integer number of subcarrier(s) in frequency domain.

In one subembodiment, any of the M1 radio resource set(s) occupies M3 multicarrier symbol(s) in time domain, and frequency-domain resources corresponding to M4 RB(s) in frequency domain, where M3 and M4 are both positive integers.

In one subembodiment, any of the M2 radio resource set(s) occupies a positive integer number of multicarrier symbol(s) in time domain, and a positive integer number of subcarrier(s) in frequency domain.

In one subembodiment, any of the M2 radio resource set(s) occupies M5 multicarrier symbol(s) in time domain, and frequency-domain resources corresponding to M6 RB(s) in frequency domain, where M5 and M6 are both positive integers.

In one subembodiment, any of the M1 radio resource set(s) comprises a Physical Uplink Control Channel (PUCCH) Resource.

In one subembodiment, any of the M2 radio resource set(s) comprises a PUCCH resource.

In one subembodiment, any of the M1 radio resource set(s) comprises time-domain resources and frequency-domain resources.

In one subembodiment, any of the M2 radio resource set(s) comprises time-domain resources and frequency-domain resources.

In one subembodiment, any of the M1 radio resource set(s) comprises code-domain resources.

In one subembodiment, any of the M2 radio resource set(s) comprises code-domain resources.

In one subembodiment, any of the M1 radio resource set(s) comprises spatial-domain resources.

In one subembodiment, any of the M2 radio resource set(s) comprises spatial-domain resources.

In one subembodiment, the first radio resource set is one of the M1 radio resource set(s).

In one subembodiment, the first radio resource set is one of the M2 radio resource set(s).

In one embodiment, the transmission beamforming vector in the present disclosure comprises at least one of a transmission analog beamforming vector or a transmission digital beamforming vector.

In one embodiment, the reception beamforming vector in the present disclosure comprises at least one of a reception analog beamforming vector or a reception digital beamforming vector.

In one embodiment, the QCL comprises QCL-Type D in the New Radio (NR) system.

In one embodiment, the QCL comprises QCL-Type A in the NR system.

In one embodiment, the QCL comprises QCL-Type B in the NR system.

In one embodiment, the QCL comprises QCL-Type C in the NR system.

In one embodiment, the QCL comprises QCL-Type D in TS 36.214.

In one embodiment, the QCL comprises QCL-Type A in TS 36.214.

In one embodiment, the QCL comprises QCL-Type B in TS 36.214.

In one embodiment, the QCL comprises QCL-Type C in TS 36.214.

In one embodiment, the first signaling and the first signal are both transmitted in sidelink.

In one embodiment, the first signaling is a piece of Sidelink Control Information (SCI).

In one embodiment, the first signaling is a physical layer signaling.

In one embodiment, a physical layer channel bearing the first signaling comprises a Physical Sidelink Control Channel (PSCCH).

In one embodiment, a physical layer channel bearing the first signal comprises a Physical Sidelink Shared Channel (PSSCH).

In one embodiment, a physical layer channel bearing the first signal comprises a PSFCH.

In one embodiment, a physical layer channel bearing the first signal comprises a PSCCH.

In one embodiment, the first signal is a HARQ-ACK for a data channel in the sidelink.

In one embodiment, the first signal is feedback for the sidelink.

In one embodiment, the first signal comprises Channel State Information (CSI) for the sidelink.

In one embodiment, the first signal comprises a Channel Quality Indicator (CQI) for the sidelink.

In one embodiment, the first signal comprises a Rank Indicator (RI) for the sidelink.

In one embodiment, the first zone identifier is a non-negative integer.

In one embodiment, the first zone identifier is a ZoneID.

In one embodiment, the first zone identifier is used to indicate where the second node is located.

In one embodiment, the second zone identifier is a non-negative integer.

In one embodiment, the second zone identifier is a ZoneID.

In one embodiment, the first node comprises a first panel and a second panel, the second zone identifier is used to indicate where the first panel is located, and the third zone identifier is used to indicate where the second panel is located.

In one embodiment, the first panel and the second panel in the present disclosure are respectively associated with the first reference signal and the second reference signal.

In one embodiment, the first reference signal is QCL with a radio signal transmitted using the first panel.

In one embodiment, the second reference signal is QCL with a radio signal transmitted using the second panel.

In one embodiment, the first panel comprises a first antenna port, the first antenna port transmitting the first reference signal.

In one embodiment, the first panel comprises a first antenna port, the first antenna port receiving the first reference signal.

In one embodiment, the second panel comprises a second antenna port, the second antenna port transmitting the second reference signal.

In one embodiment, the second panel comprises a second antenna port, the second antenna port receiving the second reference signal.

In one embodiment, two signals being QCL means that: all or partial large-scale properties of one of the two signals can be used to infer all or partial large-scale properties of the other of the two signals; the large-scale properties include: one or more of Delay Spread, Doppler Spread, Doppler Shift, Pathloss or Average Gain.

In one embodiment, the first panel in the present disclosure is associated with K1 antenna ports, and the first antenna port in the present disclosure is one of the K1 antenna ports, K1 being a positive integer greater than 1.

In one subembodiment, any two antenna ports among the K1 antenna ports are QCL.

In one embodiment, the second panel in the present disclosure is associated with K2 antenna ports, and the second antenna port in the present disclosure is one of the K2 antenna ports, K2 being a positive integer greater than 1.

In one subembodiment, any two antenna ports among the K2 antenna ports are QCL.

In one embodiment, the phrase of determining whether to transmit a first signal according to the first zone identifier and a target zone identifier has a meaning that: when the first signal is associated with a first reference signal, the first zone identifier and the second zone identifier are jointly used to determine that a distance between the second node and the first node is no greater than a first threshold, the first node transmits the first signal in the first radio resource set.

In one embodiment, the phrase of determining whether to transmit a first signal according to the first zone identifier and a target zone identifier has a meaning that: when the first signal is associated with a first reference signal, the first zone identifier and the second zone identifier are jointly used to determine that a distance between the second node and the first node is greater than a first threshold, the first node drops the first signal transmission in the first radio resource set.

In one subembodiment of the above two embodiments, the phrase of a distance between the second node and the first node means: a distance between the first panel and the second node.

In one embodiment, the phrase of determining whether to transmit a first signal according to the first zone identifier and a target zone identifier has a meaning that: when the first signal is associated with a second reference signal, the first zone identifier and the third zone identifier are jointly used to determine that a distance between the second node and the first node is no greater than a first threshold, the first node transmits the first signal in the first radio resource set.

In one embodiment, the phrase of determining whether to transmit a first signal according to the first zone identifier and a target zone identifier has a meaning that: when the first signal is associated with a second reference signal, the first zone identifier and the third zone identifier are jointly used to determine that a distance between the second node and the first node is greater than a first threshold, the first node drops the first signal transmission in the first radio resource set.

In one subembodiment of the above two embodiments, the phrase of a distance between the second node and the first node means: a distance between the second panel and the second node.

In one embodiment, the phrase of determining whether to transmit a first signal according to the first zone identifier and a target zone identifier has a meaning that: with either a first condition or a second condition fulfilled, the first node transmits the first signal in the first radio resource set.

In one embodiment, the phrase of determining whether to transmit a first signal according to the first zone identifier and a target zone identifier has a meaning that: with neither a first condition nor a second condition fulfilled, the first node drops the first signal transmission in the first radio resource set.

In one subembodiment of the above two embodiments, the first condition comprises: the first zone identifier and the second zone identifier jointly being used to determine that a distance between the second node and the first node is no greater than a first threshold.

In one subsidiary embodiment of the above subembodiment, the phrase of a distance between the second node and the first node means: a distance between the first panel and the second node.

In one subembodiment of the above two embodiments, the second condition comprises: the first zone identifier and the third zone identifier jointly being used to determine that a distance between the second node and the first node is no greater than a second threshold.

In one subsidiary embodiment of the above subembodiment, the phrase of a distance between the second node and the first node means: a distance between the second panel and the second node.

In one embodiment, the first threshold in the present disclosure is fixed, or the first threshold is configured through an RRC signaling.

In one embodiment, the second threshold in the present disclosure is fixed, or the second threshold is configured through an RRC signaling.

In one embodiment, when the first signal is associated with a first reference signal, the target zone identifier is the second zone identifier, and the second zone identifier is a zone identifier determined according to a first zone size.

In one subembodiment, the first zone size comprises a first zone length and a first zone width.

In one subembodiment, the first zone size is associated with a first radio resource pool, the first radio resource pool comprising the first radio resource set.

In one embodiment, when the first signal is associated with a second reference signal, the target zone identifier is the third zone identifier, and the third zone identifier is a zone identifier determined according to a second zone size.

In one subembodiment, the second zone size comprises a second zone length and a second zone width.

In one subembodiment, the second zone size is associated with a second radio resource pool, the second radio resource pool comprising the first radio resource set.

In one embodiment, a first index is used for generating the first signal.

In one embodiment, a first index is specific to the first node.

In one embodiment, a first index is a non-negative integer.

In one embodiment, a first index is less than 1024.

In one embodiment, a first index is less than 65536.

In one embodiment, a first index is a UE Identity (ID).

In one embodiment, a second index and a third index respectively correspond to the first panel and the second panel in the present disclosure; when the first signal is associated with the first reference signal, the second index is used for generating the first signal; when the first signal is associated with the second reference signal, the third index is used for generating the first signal.

In one embodiment, a second index is specific to the first panel.

In one embodiment, a second index is a non-negative integer.

In one embodiment, a second index is less than 1024.

In one embodiment, a second index is less than 65536.

In one embodiment, a third index is specific to the second panel.

In one embodiment, a third index is a non-negative integer.

In one embodiment, a third index is less than 1024.

In one embodiment, a third index is less than 65536.

In one embodiment, the first radio resource set comprises time-domain resources and frequency-domain resources.

In one embodiment, the first radio resource set comprises code-domain resources.

In one embodiment, the first radio resource set comprises spatial-domain resources.

In one embodiment, the first radio resource set corresponds to one antenna port.

In one embodiment, the first radio resource set corresponds to one reference signal.

In one embodiment, the first radio resource set corresponds to a beamforming vector.

In one embodiment, the first radio resource set occupies a positive integer number of multicarrier symbol(s) in time domain, and a positive integer number of subcarrier(s) in frequency domain.

In one embodiment, the first radio resource set occupies T1 multicarrier symbol(s) in time domain, and frequency-domain resources corresponding to T2 Resource Block(s) (RB(s)), where T1 and T2 are both positive integers.

In one embodiment, the first radio resource pool in the present disclosure and the second radio resource pool in the present disclosure are maintained by a same serving cell.

In one embodiment, the spatial-domain resources in the present disclosure include a transmission antenna port.

In one embodiment, a said spatial-domain resource comprised by the radio resource set in the present disclosure comprises: a target Reference Signal (RS) which is QCL with a transmission antenna port in the radio resource set.

In one embodiment, a said spatial-domain resource comprised by the radio resource set in the present disclosure comprises: a beam direction corresponding to a transmission antenna port employed by the radio resource set.

In one embodiment, a said spatial-domain resource comprised by the radio resource set in the present disclosure comprises: an analog beamforming vector corresponding to a transmission antenna port employed by the radio resource set.

In one embodiment, a said spatial-domain resource comprised by the radio resource set in the present disclosure comprises: a digital beamforming vector corresponding to a transmission antenna port employed by the radio resource set.

In one embodiment, the above phrase of dropping a first signal transmission in a first radio resource set means: maintaining a zero-transmit-power in the first radio resource set.

In one embodiment, the above phrase of dropping a first signal transmission in a first radio resource set means: releasing a buffer for storing a target information bit, the target information bit being used to generate the first signal.

In one embodiment, the above phrase of dropping a first signal transmission in a first radio resource set means: transmitting other signals in the first radio resource set, the other signals being unrelated to the information bit carried by the first signal.

In one embodiment, the first signal is transmitted in the sidelink.

In one embodiment, the first signal is a HARQ-ACK for a data channel in the sidelink.

In one embodiment, a current position of a first panel of the first node is used to determine the second zone identifier.

In one embodiment, a current position of a second panel of the first node is used to determine the third zone identifier.

In one embodiment, the first signal is a radio signal.

In one embodiment, the first signal is a baseband signal.

In one embodiment, the multicarrier symbol in the present disclosure is an Orthogonal Frequency Division Multiplexing (OFDM) Symbol.

In one embodiment, the multicarrier symbol in the present disclosure is a Single Carrier-Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is an OFDM symbol containing Cyclic Prefix (CP).

In one embodiment, the multicarrier symbol in the present disclosure is a Discrete Fourier Transform Spreading Orthogonal Frequency Division Multiplexing (DFT-s-OFDM) symbol containing CP.

In one embodiment, the sidelink refers to a radio link between terminals.

In one embodiment, the cellular link in the present disclosure refers to a radio link between a terminal and a base station.

In one embodiment, the sidelink in the present disclosure corresponds to a PC5 interface.

In one embodiment, the cellular link in the present disclosure corresponds to a Uu interface.

In one embodiment, the sidelink in the present disclosure is used for V2X communications.

In one embodiment, the cellular link in the present disclosure is used for cellular communications.

In one embodiment, the first signal is a feedback signal for V2X model transmission.

Embodiment 2

Figure 2:
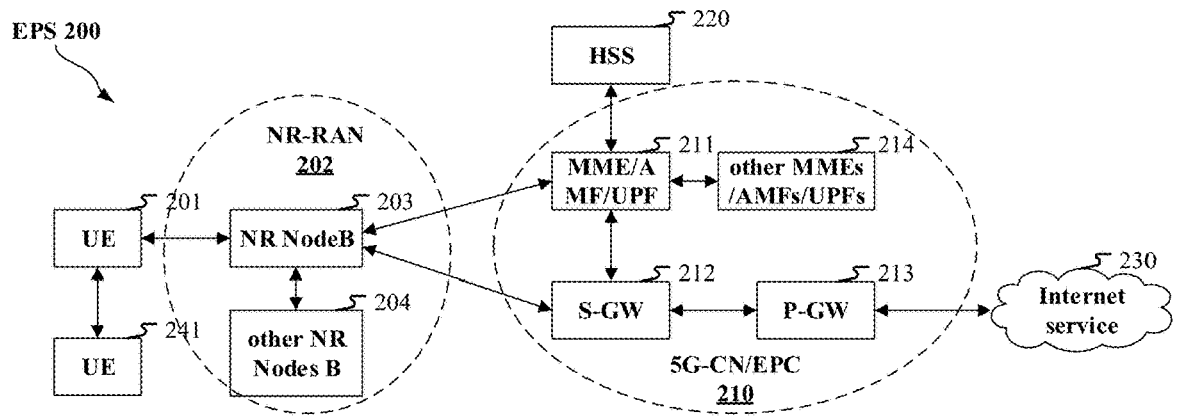
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LIE) and Long-Term Evolution Advanced (LTE-A) systems. The 5G NR or LIE network architecture 200 may be called an Evolved Packet System (EPS) 200 or other suitable terminology. The EPS 200 may comprise one or more UEs 201, a UE 241 in sidelink communication with the UE(s) 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA) phones, Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230.

The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the third node in the present disclosure.

In one embodiment, an air interface between the UE 201 and the gNB 203 is a Uu interface.

In one embodiment, an air interface between the UE 201 and the UE 241 is a PC-5 interface.

In one embodiment, a radio link between the UE 201 and the gNB 203 is a cellular link.

In one embodiment, a radio link between the UE 201 and the UE 241 is a sidelink.

In one embodiment, the first node in the present disclosure is a terminal within the coverage of the gNB 203.

In one embodiment, the second node in the present disclosure is a terminal within the coverage of the gNB 203.

In one embodiment, the second node in the present disclosure is a terminal out of the coverage of the gNB 203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, the first node and the second node belong to a V2X Pair.

In one embodiment, the first node is an automobile.

In one embodiment, the first node is a vehicle.

In one embodiment, the first node is an RSU.

In one embodiment, the first node is a Group Header of a terminal group.

In one embodiment, the first node is capable of positioning.

In one embodiment, the second node is a vehicle.

In one embodiment, the second node is an automobile.

In one embodiment, the second node is a Road Side Unit (RSU).

In one embodiment, the second node is a Group Header of a terminal group.

In one embodiment, the second node is capable of positioning.

In one embodiment, the first node has the Global Positioning System (GPS) capability.

In one embodiment, the second node has the GPS capability.

In one embodiment, the third node is a base station.

In one embodiment, the third node is a serving cell.

In one embodiment, the first node supports multiple beamforming vector transmissions.

In one embodiment, the second node supports multiple beamforming vector transmissions.

In one embodiment, the first node at least is configured with two panels, which are respectively the first panel and the second panel in the present disclosure.

Embodiment 3

Figure 3:
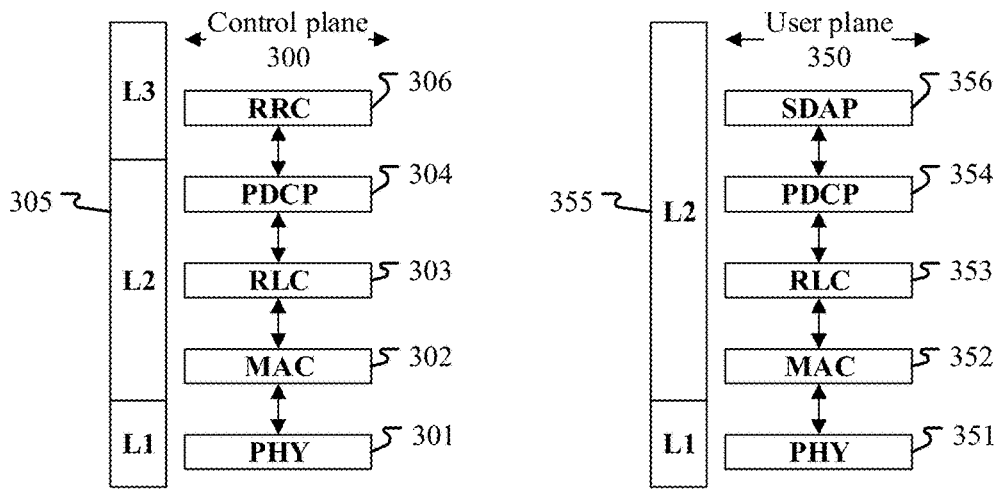
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first signaling is generated by the MAC 352, or the MAC 302.

In one embodiment, the first signaling is generated by the PHY 301, or the PHY 351.

In one embodiment, the first signal is generated by the PHY 301, or the PHY 351.

In one embodiment, the first signal is generated by the MAC 352, or the MAC 302.

In one embodiment, the first reference signal is generated by the PHY 301, or the PHY 351.

In one embodiment, the second reference signal is generated by the PHY 301, or the PHY 351.

In one embodiment, the first information is generated by the MAC 352, or the MAC 302.

In one embodiment, the first information is generated by the PHY 301, or the PHY 351.

In one embodiment, the first information is generated by the RRC 306.

In one embodiment, the second signaling is generated by the MAC 352, or the MAC 302.

In one embodiment, the second signaling is generated by the PHY 301, or the PHY 351.

In one embodiment, the target signal is generated by the PHY 301, or the PHY 351.

In one embodiment, the target signal is generated by the MAC 352, or the MAC 302.

In one embodiment, the third signaling is generated by the PHY 301, or the PHY 351.

In one embodiment, the third signaling is generated by the MAC 352, or the MAC 302.

In one embodiment, the third signaling is generated by the RRC 306.

Embodiment 4

Figure 4:
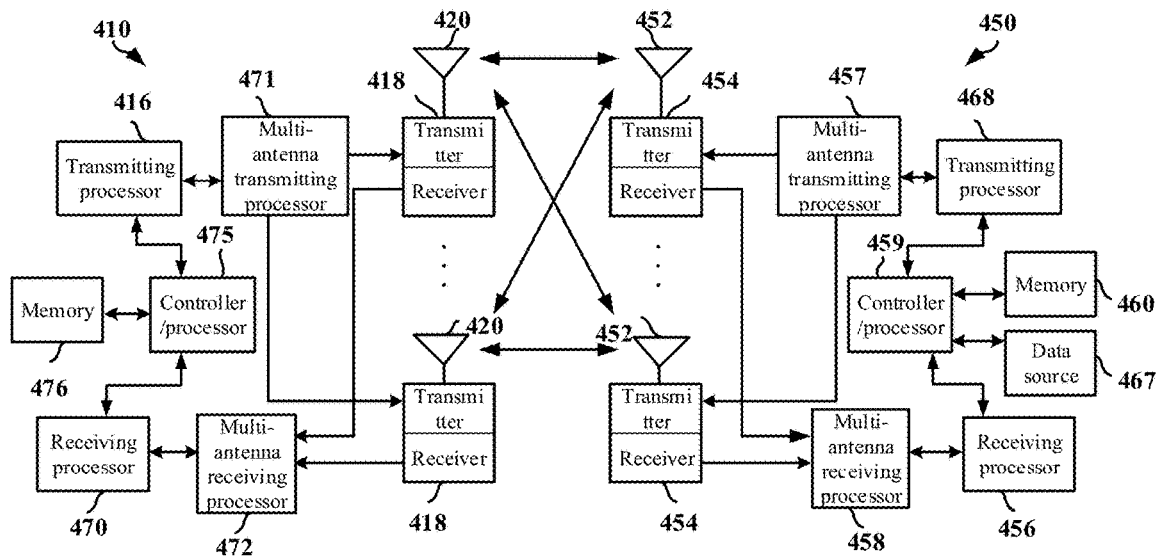
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first signaling, the first signaling being used to indicate a first zone identifier; and determines whether to transmit a first signal according to the first zone identifier and a target zone identifier; when the determination result is yes, transmits a first signal in a first radio resource set; when the determination result is no, drops a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, the first communication node 450 comprises a memory that stores a computer readable instruction program, the computer readable instruction program generates actions when executed by at least one processor, which include: receiving a first signaling, the first signaling being used to indicate a first zone identifier; and determining whether to transmit a first signal according to the first zone identifier and a target zone identifier; when the determination result is yes, transmitting a first signal in a first radio resource set; when the determination result is no, dropping a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling, the first signaling being used to indicate a first zone identifier; and detects a first signal in a first radio resource set; a transmitter for the first signal includes a first node, the first node determines whether to transmit a first signal according to the first zone identifier and a target zone identifier; when the determination result is yes, the first node transmits a first signal in a first radio resource set; if the determination result is no, the first node drops transmitting a first signal in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, the second communication device 410 comprises a memory that stores a computer readable instruction program, the computer readable instruction program generates actions when executed by at least one processor, which include: transmitting a first signaling, the first signaling being used to indicate a first zone identifier; and detecting a first signal in a first radio resource set; a transmitter for the first signal includes a first node, the first node determines whether to transmit a first signal according to the first zone identifier and a target zone identifier; when the determination result is yes, the first node transmits a first signal in a first radio resource set; if the determination result is no, the first node drops transmitting a first signal in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a third signaling; the third signaling is used to indicate a first zone size, the first zone size being used to determine a first zone identifier; a receiver for the third signaling includes at least a first node of the first node and a second node. the first node receives a first signaling, the first signaling being used to indicate the first zone identifier; the first node determines whether to transmit a first signal according to the first zone identifier and a target zone identifier; when the determination result is yes, transmits a first signal in a first radio resource set; when the determination result is no, drops a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier; the first zone size is used to determine at least the second zone identifier of the second zone identifier and the third zone identifier.

In one embodiment, the second communication device 410 comprises a memory that stores a computer readable instruction program, the computer readable instruction program generates actions when executed by at least one processor, which include: transmitting a third signaling; the third signaling is used to indicate a first zone size, the first zone size being used to determine a first zone identifier; a receiver for the third signaling includes at least a first node of the first node and a second node. the first node receives a first signaling, the first signaling being used to indicate the first zone identifier; the first node determines whether to transmit a first signal according to the first zone identifier and a target zone identifier; when the determination result is yes, transmits a first signal in a first radio resource set; when the determination result is no, drops a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier; the first zone size is used to determine at least the second zone identifier of the second zone identifier and the third zone identifier.

In one embodiment, the first communication device 450 corresponds to the first node in the present disclosure.

In one embodiment, the second communication device 410 corresponds to the second node in the present disclosure.

In one embodiment, the second communication device 410 corresponds to the third node in the present disclosure.

In one embodiment, the first communication device 450 is a UE.

In one embodiment, the second communication device 410 is a UE.

In one embodiment, the second communication device 410 is a base station.

In one embodiment, at least one of the antenna 452, the receiver 454, the multi-antenna receiving processor 458, the receiving processor 456 or the controller/processor 459 is used for receiving a first signaling, the first signaling being used to indicate a first zone identifier; at least one of the antenna 420, the transmitter 418, the multi-antenna transmitting processor 471, the transmitting processor 416 or the controller/processor 475 is used for transmitting a first signaling, the first signaling being used to indicate a first zone identifier.

In one embodiment, at least one of the antenna 452, the transmitter 454, the multi-antenna transmitting processor 457, the transmitting processor 468 or the controller/processor 459 is used for determining according to the first zone identifier and a target zone identifier whether to transmit a first signal; when the determination result is yes, transmitting a first signal in a first radio resource set; when the determination result is no, dropping a first signal transmission in a first radio resource set.

In one embodiment, at least one of the antenna 420, the receiver 418, the multi-antenna receiving processor 472, the receiving processor 470 or the controller/processor 475 is used for detecting a first signal in a first radio resource set.

In one embodiment, at least one of the antenna 452, the transmitter 454, the multi-antenna transmitting processor 457, the transmitting processor 468, or the controller/processor 459 is used for transmitting the first reference signal and the second reference signal; at least one of the antenna 420, the receiver 418, the multi-antenna receiving processor 472, the receiving processor 470 or the controller/processor 475 is used for receiving the first reference signal and the second reference signal.

In one embodiment, at least one of the antenna 452, the receiver 454, the multi-antenna receiving processor 458, the receiving processor 456, or the controller/processor 459 is used for receiving the first reference signal and the second reference signal; at least one of the antenna 420, the transmitter 418, the multi-antenna transmitting processor 471, the transmitting processor 416 or the controller/processor 475 is used for transmitting the first reference signal and the second reference signal.

In one embodiment, at least one of the antenna 452, the receiver 454, the multi-antenna receiving processor 458, the receiving processor 456, or the controller/processor 459 is used for receiving first information;

at least one of the antenna 420, the transmitter 418, the multi-antenna transmitting processor 471, the transmitting processor 416 or the controller/processor 475 is used for transmitting first information.

In one embodiment, at least one of the antenna 452, the receiver 454, the multi-antenna receiving processor 458, the receiving processor 456, or the controller/processor 459 is used for receiving a second signaling; at least one of the antenna 420, the transmitter 418, the multi-antenna transmitting processor 471, the transmitting processor 416 or the controller/processor 475 is used for transmitting a second signaling.

In one embodiment, at least one of the antenna 452, the receiver 454, the multi-antenna receiving processor 458, the receiving processor 456, or the controller/processor 459 is used for receiving a target signal; at least one of the antenna 420, the transmitter 418, the multi-antenna transmitting processor 471, the transmitting processor 416 or the controller/processor 475 is used for transmitting a target signal.

In one embodiment, at least one of the antenna 452, the receiver 454, the multi-antenna receiving processor 458, the receiving processor 456, or the controller/processor 459 is used for receiving a third signaling; at least one of the antenna 420, the transmitter 418, the multi-antenna transmitting processor 471, the transmitting processor 416 or the controller/processor 475 is used for transmitting a third signaling.

Embodiment 5

Figure 5:
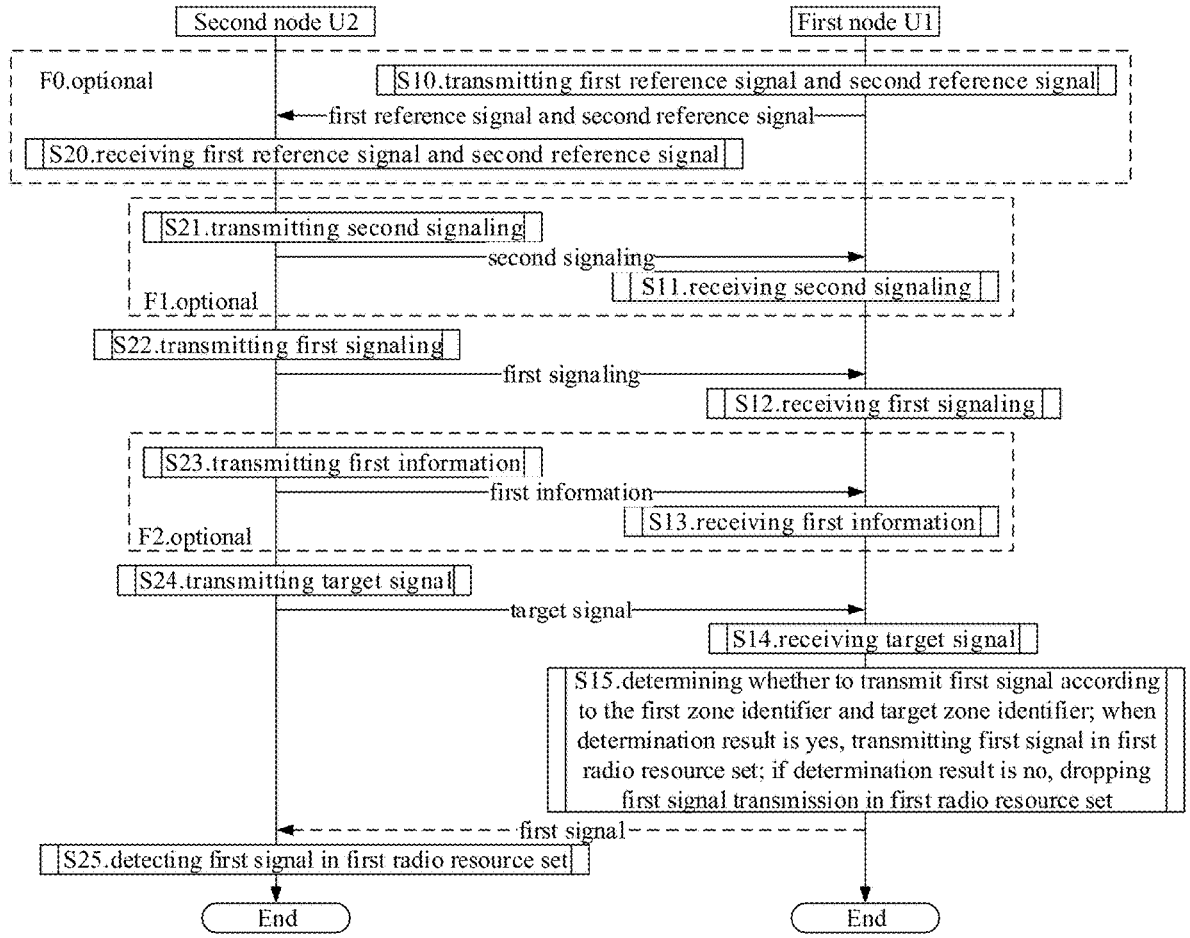
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node U2 are in communication via a sidelink; steps marked by the box F0, the box F1 and the box F2 in the figure are optional; herein, the steps being marked by broken lines indicate that their operations are subject to the decision made in step S15.

The first node U1 transmits a first reference signal and a second reference signal in step S10; receives a second signaling in step S11; and receives a first signaling in step S12; receives first information in step S13; receives a target signal in step S14; and determines whether to transmit a first signal according to the first zone identifier and a target zone identifier in step S15; when the determination result is yes, transmits a first signal in a first radio resource set; when the determination result is no, drops a first signal transmission in a first radio resource set.

The second node U2 receives a first reference signal and a second reference signal in step S20; transmits a second signaling in step S21; and transmits a first signaling in step S22; transmits first information in step S23; and transmits a target signal in step S24; and detects a first signal in a first radio resource set in step S25.

In Embodiment 5, the first signaling being used to indicate a first zone identifier; when the first signal is associated with a first reference signal, the target zone identifier is a second zone identifier; when the first signal is associated with a second reference signal, the target zone identifier is a third zone identifier; the second zone identifier is different from the third zone identifier; the first information is used to indicate that the first signal is associated with the first reference signal, or the first information is used to indicate that the first signal is associated with the second reference signal; the second zone identifier and a first offset are used to determine the third zone identifier, the first offset relating to a distance between a first panel and a second panel; a first antenna port and a second antenna port are respectively associated with the first panel and the second panel; the second signaling is used to indicate the first offset; the first signaling comprises configuration information for the target signal, the first signal being used for a feedback for the target signal; the target signal is transmitted in a sidelink.

In one embodiment, the first reference signal and the second reference signal are both Channel State Information Reference Signals (CSI-RSs).

In one embodiment, the first reference signal and the second reference signal are both Sounding Reference Signals (SRSs).

In one embodiment, the first reference signal and the second reference signal are both reference signals transmitted in sidelink.

In one embodiment, an identifier for the first node U1 is used for generating the first reference signal and the second reference signal.

In one embodiment, the phrase that the first signal is associated with a first reference signal comprises that: a transmission antenna port for the first reference signal and a transmission antenna port for the first signal are the same.

In one embodiment, the phrase that the first signal is associated with a first reference signal comprises that: a transmission antenna port for the first reference signal and a transmission antenna port for the first signal are QCL.

In one embodiment, the phrase that the first signal is associated with a first reference signal comprises that: a spatial transmission parameter group for the first reference signal is the same as a spatial transmission parameter group for the first signal.

In one embodiment, the phrase that the first signal is associated with a first reference signal comprises that: a transmission beamforming vector of the first reference signal is the same as a transmission beamforming vector of the first signal.

In one embodiment, the phrase that the first signal is associated with a second reference signal comprises that: a transmission antenna port for the second reference signal and a transmission antenna port for the first signal are the same.

In one embodiment, the phrase that the first signal is associated with a second reference signal comprises that: a transmission antenna port for the second reference signal and a transmission antenna port for the first signal are QCL.

In one embodiment, the phrase that the first signal is associated with a second reference signal comprises that: a spatial transmission parameter group for the second reference signal is the same as a spatial transmission parameter group for the first signal.

In one embodiment, the phrase that the first signal is associated with a second reference signal comprises that: a transmission beamforming vector of the second reference signal is the same as a transmission beamforming vector of the first signal.

In one embodiment, two antenna ports being QCL means that: all or partial large-scale properties of a radio signal transmitted from one of the two antenna ports can be used to infer all or partial large-scale properties of a radio signal transmitted from the other one of the two antenna ports; the large-scale properties include: one or more of Delay Spread, Doppler Spread, Doppler Shift, Pathloss or Average Gain.

In one embodiment, the first information is used to indicate that the first signal is associated with the first reference signal.

In one embodiment, the first information is used to indicate that the first signal is associated with the second reference signal.

In one embodiment, the first information is a field in the first signaling.

In one embodiment, the first signaling comprises the first information.

In one embodiment, the first information is an RRC signaling.

In one embodiment, the first information is transmitted in a sidelink.

In one embodiment, the first information is transmitted in a PC-5 link.

In one embodiment, the first information is a MAC Control Element (CE).

In one embodiment, when the first signal is associated with the first reference signal, and the first node U1's determination result is yes, the first signal is transmitted on the first antenna port; when the first signal is associated with the second reference signal, and the first node U1's determination result is yes, the first signal is transmitted on the second antenna port.

In one embodiment, the second zone identifier is used to determine where the first panel is located, while the third zone identifier is used to determine where the second panel is located.

In one embodiment, the first offset is autonomously determined by the first node U1.

In one embodiment, the first node U1 determines the first offset based on the distance between the first panel and the second panel.

In one embodiment, the first offset comprises a first horizontal offset and a first vertical offset.

In one subembodiment, the first horizontal offset is used to determine a horizontal distance between the second panel and the first panel, while the first vertical offset is used to determine a vertical distance between the second panel and the first panel.

In one embodiment, the first antenna port is used for transmitting the first reference signal, or the first antenna port is used for receiving the first reference signal.

In one embodiment, the second antenna port is used for transmitting the second reference signal, or the second antenna port is used for receiving the second reference signal.

In one embodiment, the first antenna port is associated with the first reference signal.

In one embodiment, the second antenna port is associated with the second reference signal.

In one embodiment, the first antenna port and the second antenna port are both associated with a target radio resource pool, the first radio resource set being part of the target radio resource pool.

In one embodiment, the first antenna port and the second antenna port are respectively associated with a first radio resource pool and a second radio resource pool.

In one embodiment, the second zone identifier and the third zone identifier are both determined according to a same zone size, the same zone size comprising a same zone length and a same zone width.

In one embodiment, the second zone identifier and the third zone identifier are both determined according to a first zone size, the first zone size comprising a first zone length and a first zone width.

In one subembodiment, the first zone identifier is determined according to the first zone size.

In one subembodiment, the first zone size identifies a size of a zone.

In one embodiment, the second node U2 determines the first zone identifier according to a first zone size; the first node U1 determines the second zone identifier for the first panel according to the first zone size, and determines the third zone identifier for the second panel according to the first zone size; the first zone size is configured by the third node in the present disclosure.

In one subembodiment, the first zone identifier, the second zone identifier and the third zone identifier are zone identifiers determined according to locations relative to the third node N3 in the present disclosure.

In one subembodiment, the first zone identifier is used to determine information for a location of the second node U2 relative to a base station for a serving cell for the second node U2 according to the first zone size.

In one subembodiment, the second zone identifier is used to determine information for a location of a first panel of the first node U1 relative to a base station for a serving cell for the first node U1 according to the first zone size.

In one subembodiment, the third zone identifier is used to determine information for a location of a second panel of the first node U1 relative to a base station for a serving cell for the first node U1 according to the first zone size.

In one embodiment, the second signaling is a higher-layer signaling.

In one embodiment, the second signaling is an RRC signaling.

In one embodiment, the second signaling is a MAC CE.

In one embodiment, the second signaling is specific to the first node U1.

In one embodiment, the second signaling is specific to the second panel in the present disclosure.

In one embodiment, the first signaling is used for scheduling the target signal.

In one embodiment, the configuration information comprises a Modulation and Coding Scheme (MCS) employed by the target signal.

In one embodiment, the configuration information comprises DeModulation Reference Signals (DMRS) configuration information for the target signal.

In one embodiment, the DMRS configuration information comprises one or more of a port for the DMRS, time-domain resources occupied, frequency-domain resources occupied, code-domain resources occupied, an RS sequence, a mapping mode, a DMRS type, a cyclic shift, or an Orthogonal Cover Code (OCC).

In one embodiment, the configuration information comprises a New Data Indicator (NDI) corresponding to the target signal.

In one embodiment, the configuration information comprises a Redundancy Version (RV) corresponding to the target signal.

In one embodiment, the configuration information comprises time-domain resources occupied by the target signal.

In one embodiment, the configuration information comprises frequency-domain resources occupied by the target signal.

In one embodiment, the second node U2 and the first node U1 are in V2X communications.

In one embodiment, the second node U2 and the first node U1 belong to a same serving cell.

In one embodiment, the second node U2 and the first node U1 are served by a same serving cell.

In one embodiment, the second node U2 and the first node U1 are respectively served by different serving cells.

In one embodiment, the first signaling is used to indicate the first radio resource set.

In one embodiment, the first signaling is used to determine the first radio resource set.

In one embodiment, time-domain resources occupied by the first signal are used to determine time-domain resources occupied by the first radio resource set.

In one embodiment, frequency-domain resources occupied by the first signal are used to determine frequency-domain resources occupied by the first radio resource set.

In one embodiment, the target signal is a radio signal.

In one embodiment, the target signal is a baseband channel.

In one embodiment, the first node U1 and the second node U2 are served by a same serving cell, and the third node N3 is a base station attached to the serving cell for the first node U1.

In one embodiment, the first node U1 and the second node U2 are served by different serving cells, and the third node N3 is a base station attached to the serving cell for the first node U1.

In one embodiment, the first node U1 and the second node U2 are served by different serving cells, and the third node N3 is a base station attached to the serving cell for the second node U2.

In one embodiment, the first signaling is used to indicate whether the target signal is correctly received.

In one embodiment, the first signaling is used to indicate that the target signal is falsely received.

In one embodiment, the first signaling is used to indicate that the target signal is correctly received.

In one embodiment, the first signaling is only used to indicate that the target signal is falsely received.

In one embodiment, the detection includes energy detection.

In one embodiment, the detection includes blind detection.

In one embodiment, the detection includes sequence detection.

In one embodiment, the detection includes coherent detection.

In one embodiment, the second node U2 is not aware about whether the first signal is transmitted before receiving the first signal.

Embodiment 6

Figure 6:
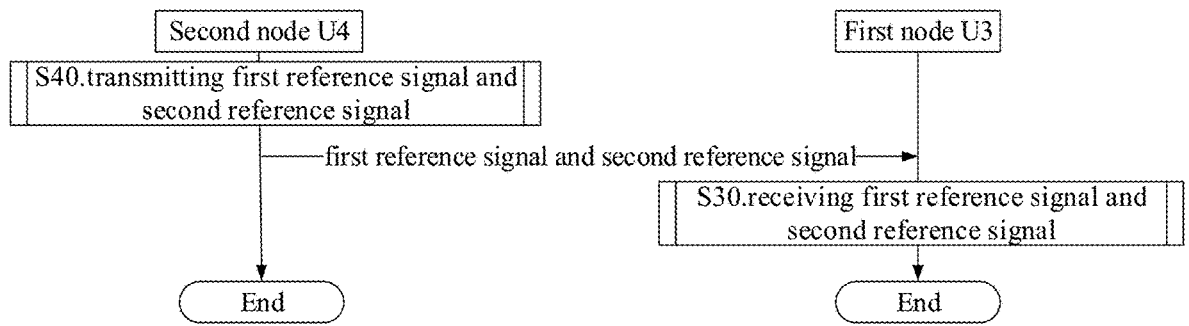
FIG. 6 illustrates a flowchart of a first reference signal and a second reference signal according to one embodiment of the present disclosure.

Embodiment 6 illustrates a flowchart of a first reference signal and a second reference signal according to the present disclosure; as shown in FIG. 6. In FIG. 6, a first node U3 and a second node U4 are in communication via a sidelink, in the case of no conflict, embodiments, subembodiments and subsidiary embodiments of the Embodiment 5 can be applied to Embodiment 6; contrariwise, the embodiments, subembodiments, and subsidiary embodiments in Embodiment 6 are also applicable to Embodiment 5.

The first node U3 receives a first reference signal and a second reference signal in step S30;

the second node U4 transmits a first reference signal and a second reference signal in step S40.

In one embodiment, the first reference signal and the second reference signal are DM-RSs.

In one embodiment, an identifier for the second node U4 is used for generating the first reference signal and the second reference signal.

In one embodiment, the above-mentioned phrase that the first signal is associated with a first reference signal comprises that: a transmission antenna port for the first reference signal is used to determine a transmission antenna port for the first signal.

In one embodiment, the above-mentioned phrase that the first signal is associated with a first reference signal comprises that: a spatial receive parameter group for the first reference signal is used to determine a spatial transmission parameter group for the first signal.

In one embodiment, the above-mentioned phrase that the first signal is associated with a first reference signal comprises that: a receive beamforming vector of the first reference signal is used to determine a transmission beamforming vector of the first signal.

In one embodiment, the above-mentioned phrase that the first signal is associated with a second reference signal comprises that: a transmission antenna port for the second reference signal is used to determine a transmission antenna port for the first signal.

In one embodiment, the above-mentioned phrase that the first signal is associated with a second reference signal comprises that: a spatial receive parameter group for the second reference signal is used to determine a spatial transmission parameter group for the first signal.

In one embodiment, the above-mentioned phrase that the first signal is associated with a second reference signal comprises that: a receive beamforming vector of the second reference signal is used to determine a transmission beamforming vector of the first signal.

Embodiment 7

Figure 7:
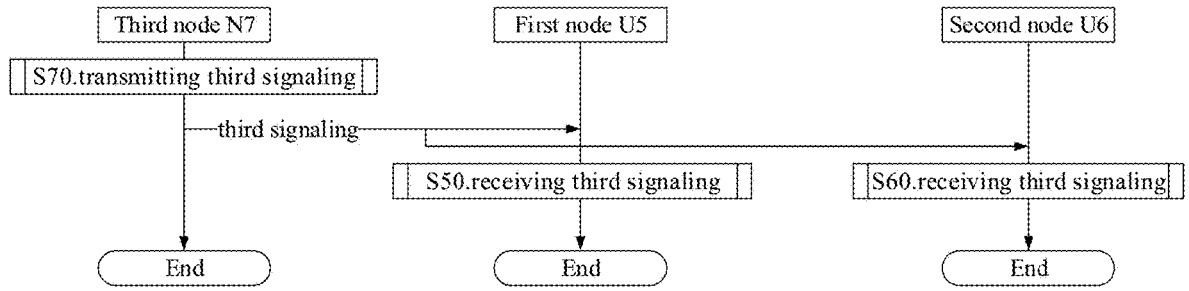
FIG. 7 illustrates a flowchart of a third signaling according to one embodiment of the present disclosure.

FIG. 7 illustrates a flowchart of a third signaling according to the present disclosure; as shown in FIG. 7. In FIG. 7, a third node N7 is in communications with a first node U5 and a second node U6 via a cellular link. When no conflict is incurred, the embodiments, subembodiments, and subsidiary embodiments in Embodiment 7 are also applicable to Embodiment 5 and Embodiment 6; contrariwise, the embodiments, subembodiments, and subsidiary embodiments in Embodiment 5 and Embodiment 6 are also applicable to Embodiment 7.

The first node U5 receives a third signaling in step S50.
The second node U6 receives a third signaling in step S60.
The third node N7 transmits a third signaling in step S70.

In Embodiment 7, the third signaling is used to indicate a first zone size, the first zone size being used to determine a first zone identifier.

In one embodiment, the first zone size is used to determine at least the second zone identifier of the second zone identifier and the third zone identifier.

In one embodiment, the third signaling is used to indicate a second zone size, the second zone size being used to determine the third zone identifier.

In one embodiment, the first zone size comprises a first zone length and a first zone width, the first zone length being equal to X1 meters, the first zone width being equal to Y1 meters, where X1 and Y1 are positive integers greater than 1.

In one subembodiment, a product of the X1 and the Y1 denotes what the first zone size is.

In one subembodiment, the first zone length equals a zoneLength in TS 36.331, and the first zone width equals a zoneWidth in TS 36.331.

In one embodiment, the second zone size comprises a second zone length and a second zone width, the second zone length being equal to X2 meters, the second zone width being equal to Y2 meters, where X2 and Y2 are positive integers greater than 1

In one subembodiment, a product of the X2 and the Y2 denotes what the second zone size is.

In one subembodiment, the second zone length equals a zoneLength in TS 36.331, and the second zone width equals a zoneWidth in TS 36.331.

In one embodiment, the third signaling comprises SL-ZoneConfig in TS 36.331.

In one embodiment, the first zone size and the second zone size in the present disclosure are respectively associated with the first radio resource pool and the second radio resource pool.

In one subembodiment, the first zone size identifies a size of a zone.

In one subsidiary embodiment of the above subembodiment, the size of a zone identified by the first zone size is associated with the first panel in the present disclosure.

In one subsidiary embodiment of the above subembodiment, the size of a zone identified by the first zone size is associated with the first panel in the present disclosure.

In one subembodiment, the second zone size identifies a size of a zone.

In one subsidiary embodiment of the above subembodiment, the size of a zone identified by the second zone size is associated with the second panel in the present disclosure.

In one embodiment, the third signaling is an RRC signaling.

In one embodiment, the third signaling is a higher-layer signaling.

In one embodiment, the third signaling is cell-specific, or the third signaling is specific to a Transmit-Receive Point (TRP-specific).

Embodiment 8

Figure 8:
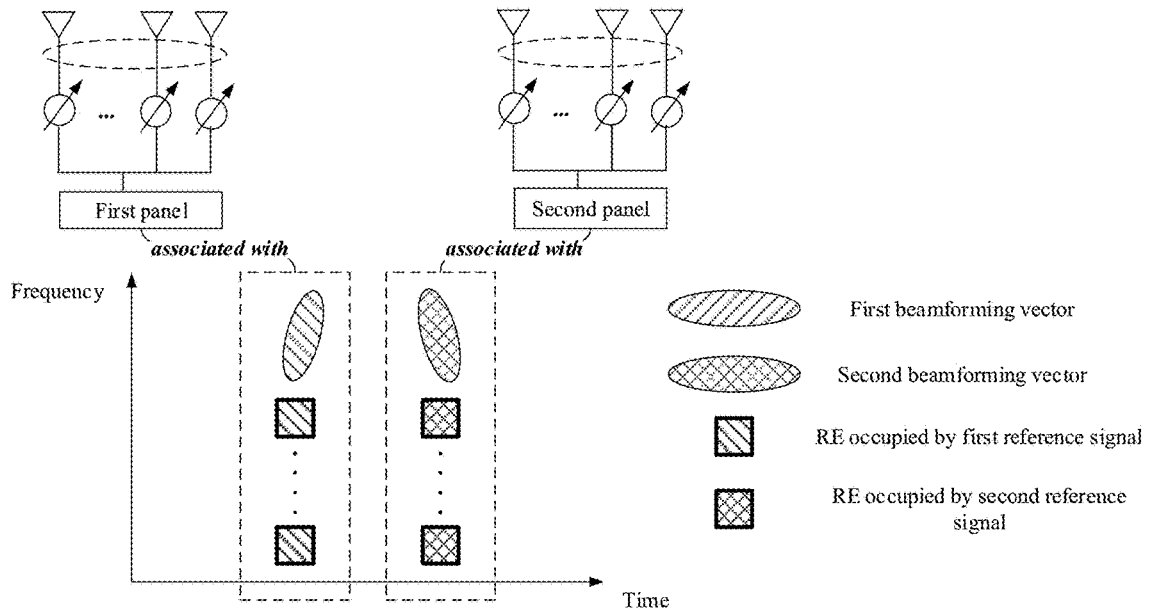
FIG. 8 illustrates a schematic diagram of a first reference signal and a second reference signal according to one embodiment of the present disclosure.

Embodiment 8 illustrates a schematic diagram of a first reference signal and a second reference signal, as shown in FIG. 8. In FIG. 8, the first reference signal and the second reference signal are respectively associated with a first panel and a second panel, and the first reference signal and the second reference signal are respectively associated with a first beamforming vector and a second beamforming vector.

In one embodiment, the first reference signal and a radio signal transmitted on the first panel are both transmitted using the first beamforming vector.

In one embodiment, the second reference signal and a radio signal transmitted on the second panel are both transmitted using the second beamforming vector.

In one embodiment, the first reference signal is received using the first beamforming vector, and a radio signal transmitted on the first panel is transmitted using the first beamforming vector.

In one embodiment, the second reference signal is received using the second beamforming vector, and a radio signal transmitted on the second panel is transmitted using the second beamforming vector.

Embodiment 9

Figure 9:
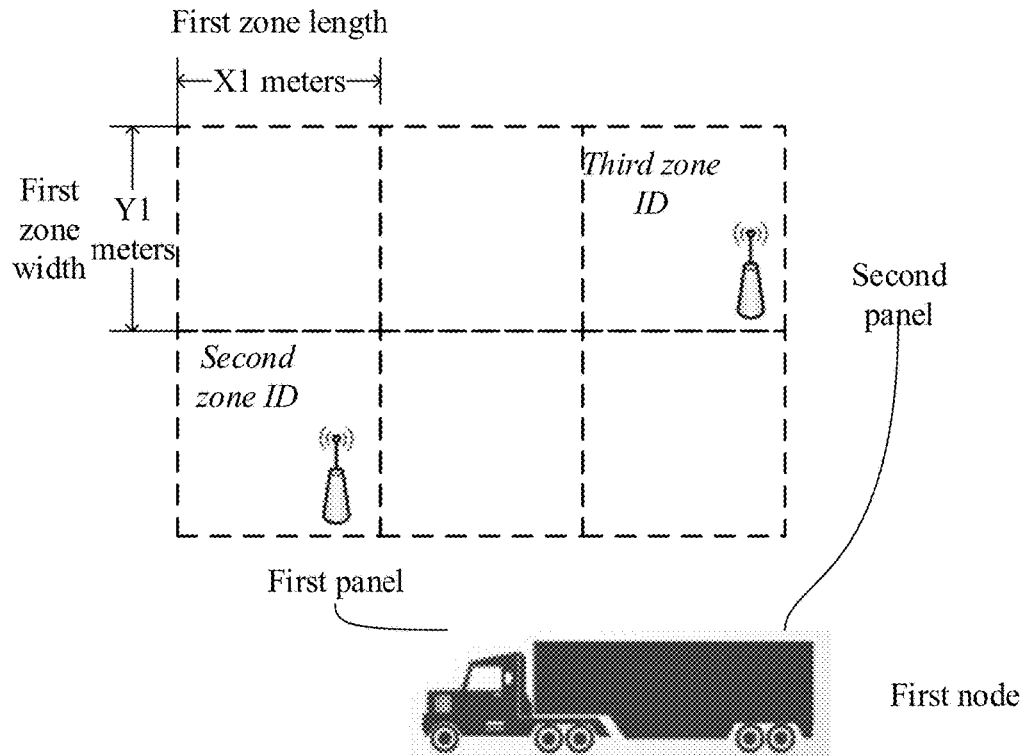
FIG. 9 illustrates a schematic diagram of a second zone identifier and a third zone identifier according to one embodiment of the present disclosure.

Embodiment 9 illustrates a schematic diagram of a second zone identifier and a third zone identifier, as shown in FIG. 9. In FIG. 9, the second zone identifier and the third zone identifier are respectively used to indicate respective positions of the first panel and the second panel in the present disclosure; the second zone identifier and the third zone identifier are obtained based on the first zone size; the first zone size comprises a first zone length and a first zone width, the first zone length being equal to X1 meters, and the first zone width being equal to Y1 meters; the first offset is used to determine a difference value between the second zone identifier and the third zone identifier; the large rectangular box in FIG. 9 corresponds to zones divided according to the first zone size.

In one embodiment, the first offset comprises a first horizontal offset and a first vertical offset.

In one subembodiment, the first horizontal offset is used to indicate a distance between a zone corresponding to the second zone identifier and a zone corresponding to the third zone identifier along the horizontal axis.

In one subembodiment, the first horizontal offset is used to indicate a number of interval zones between a zone corresponding to the second zone identifier and a zone corresponding to the third zone identifier along the horizontal axis.

In one subembodiment, the first vertical offset is used to indicate a distance between a zone corresponding to the second zone identifier and a zone corresponding to the third zone identifier along the vertical axis.

In one subembodiment, the first vertical offset is used to indicate a number of interval zones between a zone corresponding to the second zone identifier and a zone corresponding to the third zone identifier along the vertical axis.

In one embodiment, dividing by the first zone size illustrated herein refers to zoning centered on the third node in the present disclosure.

Embodiment 10

Figure 10:
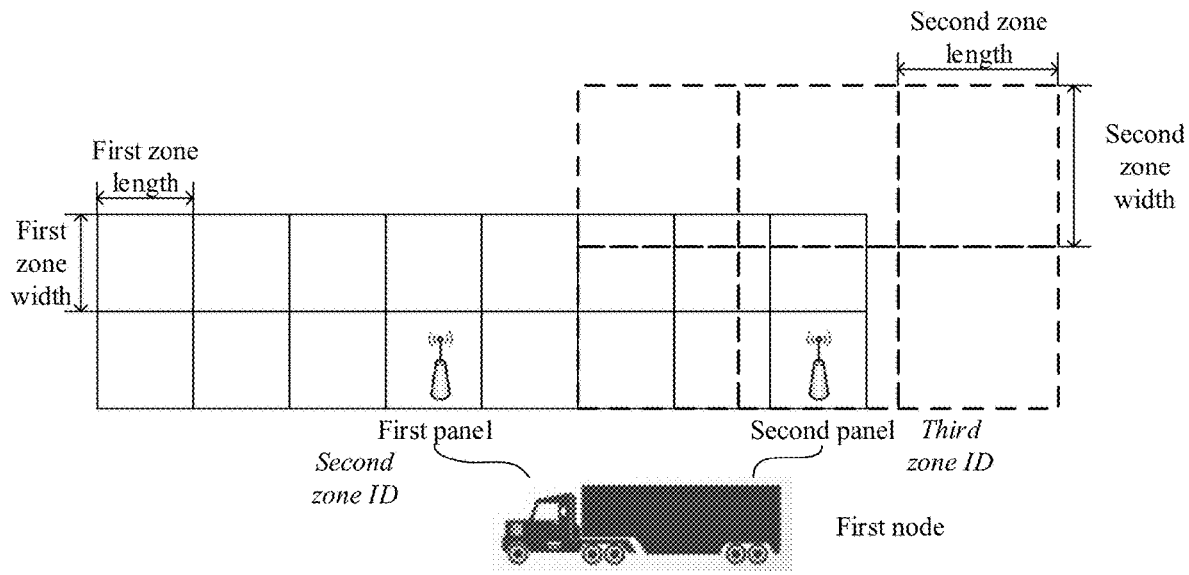
FIG. 10 illustrates a schematic diagram of a second zone identifier and a third zone identifier according to another embodiment of the present disclosure.

Embodiment 10 illustrates another schematic diagram of a second zone identifier and a third zone identifier, as shown in FIG. 10. In FIG. 10, the second zone identifier and the third zone identifier are respectively used to indicate respective positions of the first panel and the second panel in the present disclosure; the second zone identifier is obtained based on a first zone size, and the third zone identifier is obtained based on a second zone size; the first zone size comprises a first zone length and a first zone width, the first zone length being equal to X1 meters, and the first zone width being equal to Y1 meters; the second zone size comprises a second zone length and a second zone width, the second zone length being equal to X2 meters, and the second zone width being equal to Y2 meters; in FIG. 10, the large solid-line rectangle corresponds to zones divided according to the first zone size, while the large broken-line rectangle corresponds to zones divided according to the second zone size.

In one embodiment, the first zone size and the second zone size are respectively associated with the first reference signal and the second reference signal.

In one embodiment, the first zone size and the second zone size are respectively associated with the first radio resource pool and the second radio resource pool.

In one embodiment, the first zone size and the second zone size are respectively associated with the first beamforming vector and the second beamforming vector.

Embodiment 11

Figure 11:
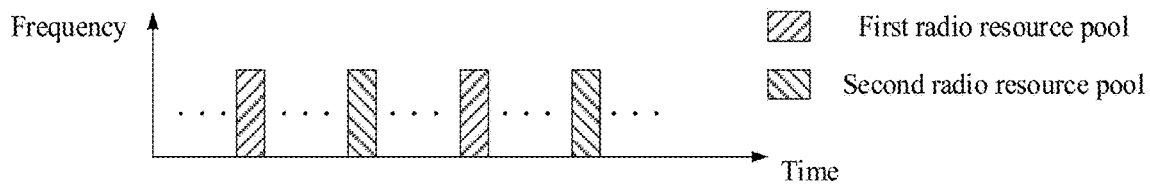
FIG. 11 illustrates a schematic diagram of a first radio resource pool and a second radio resource pool according to one embodiment of the present disclosure.

Embodiment 11 illustrates a schematic diagram of a first radio resource pool and a second radio resource pool, as shown in FIG. 11. In FIG. 11, the first radio resource pool comprises K1 radio resource sets, while the second radio resource pool comprises K2 radio resource sets; There is at least one first-type radio resource set among the K1 radio resource sets, and there is at least one second-type radio resource set among the K2 radio resource sets, where the at least one first-type radio resource set and the at least one second-type radio resource set occupy the same REs; the first radio resource pool and the second radio resource pool are respectively associated with the first reference signal and the second reference signal.

In one embodiment, the first radio resource pool and the second radio resource pool respectively correspond to different spatial-domain resources.

In one embodiment, the first radio resource pool and the second radio resource pool respectively correspond to different spatial transmission parameter groups.

In one embodiment, the first radio resource pool and the second radio resource pool respectively correspond to different spatial receive parameter groups.

In one embodiment, the first radio resource pool and the second radio resource pool respectively correspond to different antenna ports.

In one embodiment, the first radio resource pool and the second radio resource pool are respectively associated to the first beamforming vector and the second beamforming vector in the present disclosure.

Embodiment 12

Figure 12:
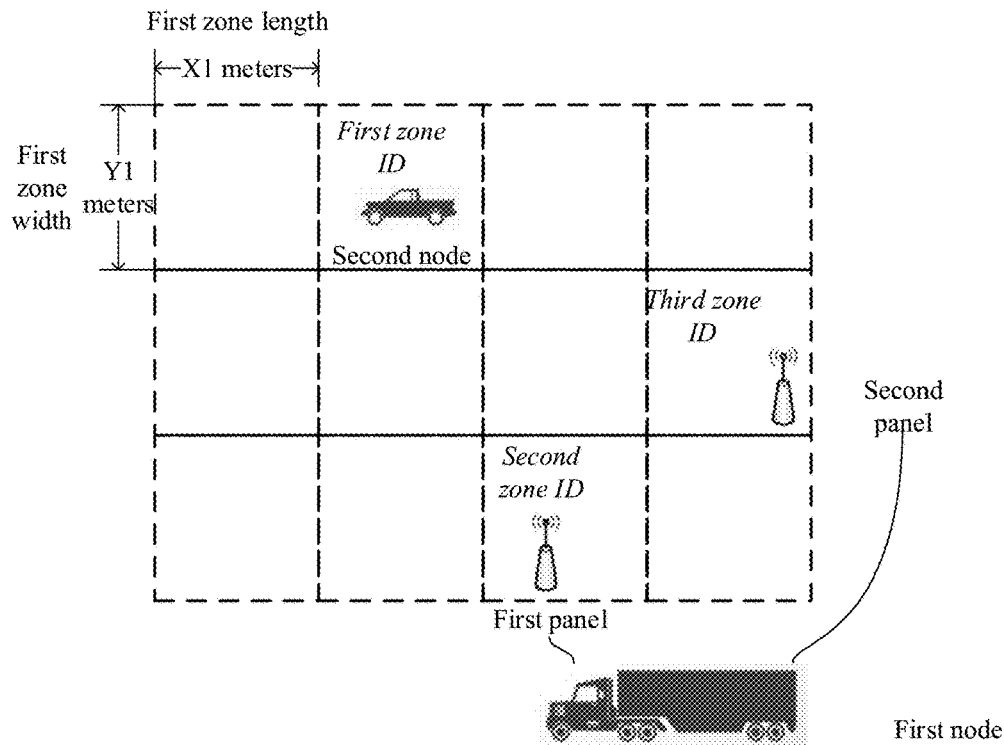
FIG. 12 illustrates a schematic diagram illustrating a positional relation between a first node and a second node according to one embodiment of the present disclosure.

Embodiment 12 illustrates a schematic diagram of relationship between a first node and a second node, as shown in FIG. 12. In FIG. 12, the large rectangular box framed with broken lines represents zones divided according to a first zone size, the first zone size comprising a first zone length and a first zone width; the zone in which the second node is located corresponds to a first zone identifier, while the zone in which a first panel of the first node is located corresponds to a second zone identifier, the zone in which a second panel of the first node is located corresponds to a third zone identifier; the first zone identifier, the second zone identifier and the third zone identifier are obtained based on the first zone size.

In one embodiment, a difference between the first zone identifier and the second zone identifier is used by the first node to determine a distance between the second node and the first panel.

In one embodiment, a difference between the first zone identifier and the third zone identifier is used by the first node to determine a distance between the second node and the second panel.

In one embodiment, a distance from any of the second zone identifier or the third zone identifier to the first zone identifier is smaller than a given threshold, the first node transmits the first signal.

Embodiment 13

Figure 13:
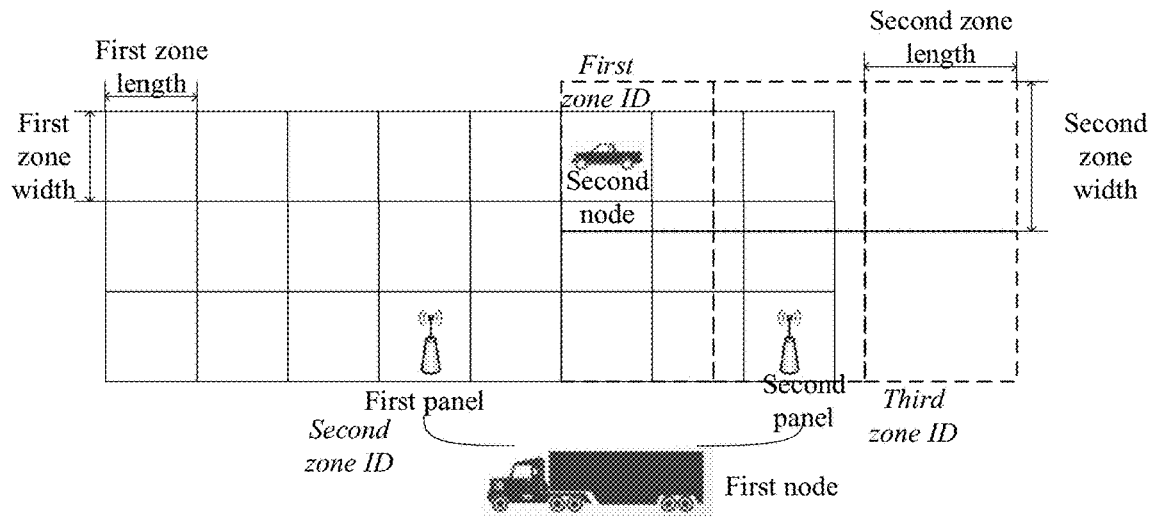
FIG. 13 illustrates a schematic diagram illustrating a positional relation between a first node and a second node according to another embodiment of the present disclosure.

Embodiment 13 illustrates another schematic diagram of relationship between a first node and a second node, as shown in FIG. 13. In FIG. 12, the large rectangular box framed with solid lines represents zones divided according to a first zone size, the first zone size comprising a first zone length and a first zone width; the large rectangular box framed with broken lines represents zones divided according to a second zone size, the second zone size comprising a second zone length and a second zone width; the zone in which the second node is located corresponds to a first zone identifier, while the zone in which a first panel of the second node is located corresponds to a second zone identifier, the zone in which a second panel of the second node is located corresponds to a third zone identifier.

In one embodiment, when the first signal is associated with the first reference signal, the first zone identifier and the second zone identifier are obtained based on the first zone size, and a difference between the first zone identifier and the second zone identifier is used by the first node to determine whether the first signal is transmitted.

In one embodiment, when the first signal is associated with the second reference signal, the first zone identifier and the third zone identifier are obtained based on the second zone size, and a difference between the first zone identifier and the third zone identifier is used by the first node to determine whether the first signal is transmitted.

Embodiment 14

Figure 14:
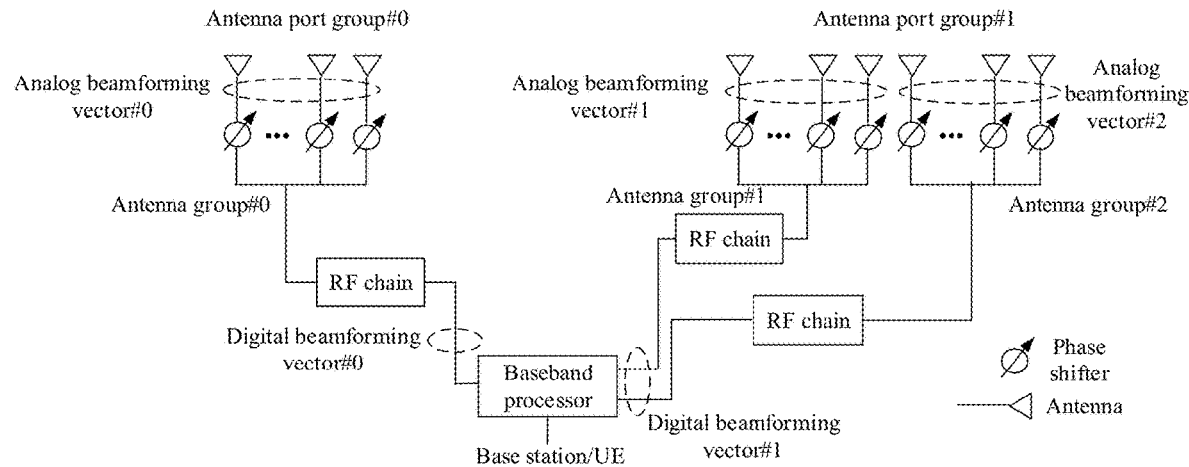
FIG. 14 illustrates a schematic diagram of an antenna structure of a node according to one embodiment of the present disclosure.

Embodiment 14 illustrates a schematic diagram of antennas and antenna port groups, as shown in FIG. 14.

In Embodiment 14, an antenna port group is comprised of a positive integer number of antenna port(s); an antenna port is formed by superimposing antennas in a positive integer number of antenna group(s) through antenna virtualization; an antenna group is comprised of a positive integer number of antenna(s). One antenna group is connected to a baseband processor through a Radio Frequency (RF) chain, so each antenna group corresponds to a different RF chain. Mapping coefficients of all antennas in a positive integer number of antenna group(s) comprised by a given antenna port to the given antenna port constitute a beamforming vector corresponding to the given antenna port. Mapping coefficients of multiple antennas comprised in any given one of a positive integer number of antenna groups comprised by the given antenna port to the given antenna port constitute an analog beamforming vector for the given antenna port. Analog beamforming vectors respectively corresponding to the positive integer number of antenna groups are diagonally arranged to form an analog beamforming matrix corresponding to the given antenna port. Mapping coefficients of the positive integer number of antenna groups to the given antenna port constitute a digital beamforming vector corresponding to the given antenna port. A beamforming vector corresponding to the given antenna port is a product of the analog beamforming matrix and the digital beamforming vector respectively corresponding to the given antenna port. Each antenna port in antenna port group is composed of (a) same antenna group(s), and different antenna ports in a same antenna port group correspond to different beamforming vectors.

FIG. 14 illustrates two antenna port groups, which are antenna port group #0 and antenna port group #1. Herein, the antenna port group is composed of antenna group #0, while the antenna port group #1 is composed of antenna group #1 and antenna group #2. Mapping coefficients of multiple antennas comprised in the antenna group #0 to the antenna port group #0 constitute an analog beamforming vector #0; a mapping coefficient of the antenna group #0 to the antenna port group #0 constitute a digital beamforming vector #0. Mapping coefficients of multiple antennas comprised in the antenna group #1 to the antenna port group #1 and mapping coefficients of multiple antennas comprised in the antenna group #2 to the antenna port group #1 respectively constitute an analog beamforming vector #1 and an analog beamforming vector #2; respective mapping coefficients of the antenna group #1 and the antenna group #2 to the antenna port group #1 constitute a digital beamforming vector #1. A beamforming vector corresponding to any antenna port comprised by the antenna port group #0 is a product of the analog beamforming vector #0 and the digital beamforming vector #0. A beamforming vector corresponding to any antenna port comprised by the antenna port group #1 is a product of the digital beamforming vector #1 and an analog beamforming matrix formed by diagonally arrangement of the analog beamforming vector #1 and the analog beamforming vector #2.

In one subembodiment, an antenna port group comprises one antenna port. For example, the antenna port group #0 in FIG. 14 comprises one antenna port.

In one subsidiary embodiment of the above subembodiment, an analog beamforming matrix corresponding to the one antenna port is dimensionally reduced to an analog beamforming vector, while a digital beamforming vector corresponding to the one antenna port is dimensionally reduced to a scaler, a beamforming vector corresponding to the one antenna port is equivalent to an analog beamforming vector corresponding to the one antenna port.

In one subembodiment, an antenna port group comprises multiple antenna ports. For example, the antenna port group #1 in FIG. 14 comprises multiple antenna ports.

In one subsidiary embodiment of the above subembodiment, the multiple antenna ports correspond to a same analog beamforming matrix and different digital beamforming vectors.

In one subembodiment, antenna ports in different antenna port groups correspond to different analog beamforming matrices.

In one subembodiment, any two antenna ports in an antenna port group are Quasi-Colocated (QCL).

In one subembodiment, any two antenna ports in an antenna port group are spatial QCL.

Embodiment 15

Figure 15:
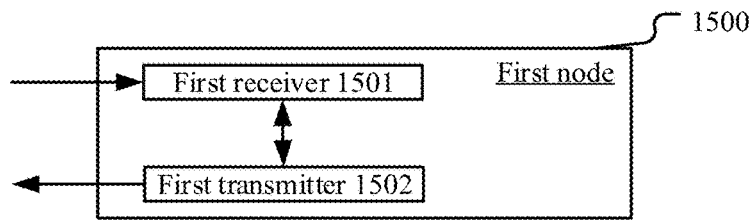
FIG. 15 illustrates a structure block diagram used in a first node according to one embodiment of the present disclosure.

Embodiment 15 illustrates a structure block diagram of a first node, as shown in FIG. 15. In FIG. 15, a first node 1500 comprises a first receiver 1501 and a first transmitter 1502.

The first receiver 1501 receives a first signaling, the first signaling being used to indicate a first zone identifier;

the first transmitter 1502 determines whether to transmit a first signal according to the first zone identifier and a target zone identifier; when the determination result is yes, transmitting a first signal in a first radio resource set; when the determination result is no, dropping a first signal transmission in a first radio resource set;

In Embodiment 15, when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, the first transmitter 1502 transmits the first reference signal and the second reference signal.

In one embodiment, the first receiver 1501 receives the first reference signal and the second reference signal.

In one embodiment, the first receiver 1501 receives first information; the first information is used to indicate that the first signal is associated with the first reference signal, or the first information is used to indicate that the first signal is associated with the second reference signal.

In one embodiment, the second zone identifier and a first offset are used to determine the third zone identifier, the first offset relating to a distance between a first panel and a second panel; a first antenna port and a second antenna port are respectively associated with the first panel and the second panel.

In one embodiment, the first receiver 1501 receives a second signaling, the second signaling being used to indicate the first offset.

In one embodiment, the first receiver 1501 receives a target signal; the first signaling comprises configuration information for the target signal, the first signal being used for feedback for the target signal; the target signal is transmitted in a sidelink.

In one embodiment, the first receiver 1501 receives a third signaling; the third signaling is used to indicate a first zone size, the first zone size being used to determine a first zone identifier.

In one embodiment, the first zone size is used to determine at least the second zone identifier of the second zone identifier and the third zone identifier.

In one embodiment, the third signaling is used to indicate a second zone size, the second zone identifier being used to determine the third zone identifier.

In one embodiment, the first receiver 1501 comprises at least the first four of the antenna 452, the receiver 454, the multi-antenna receiving processor 458, the receiving processor 456 and the controller/processor 459 in Embodiment 4.

In one embodiment, the first transmitter 1502 comprises at least the first four of the antenna 452, the transmitter 454, the multi-antenna transmitting processor 457, the transmitting processor 468 and the controller/processor 459 in Embodiment 4.

Embodiment 16

Figure 16:
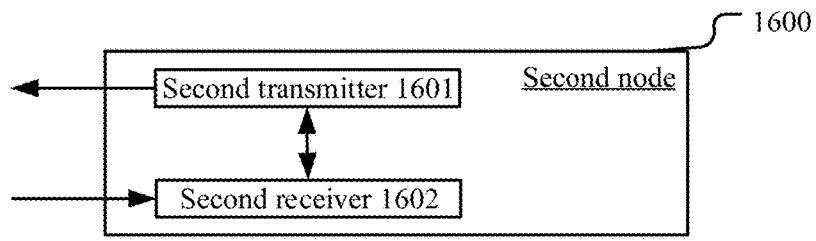
FIG. 16 illustrates a structure block diagram used in a second node according to one embodiment of the present disclosure.

Embodiment 16 illustrates a structure block diagram of a second node, as shown in FIG. 16. In FIG. 16, a second node 1600 comprises a second transmitter 1601 and a second receiver 1602.

The second transmitter 1601 transmits a first signaling, the first signaling being used to indicate a first zone identifier;

the second receiver 1602 detects a first signal in a first radio resource set.

In Embodiment 16, a transmitter for the first signal includes a first node, the first node determines whether to transmit a first signal according to the first zone identifier and a target zone identifier; when the determination result is yes, the first node transmits a first signal in a first radio resource set; if the determination result is no, the first node drops transmitting a first signal in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier.

In one embodiment, the second receiver 1602 receives the first reference signal and the second reference signal.

In one embodiment, the second transmitter 1601 transmits the first reference signal and the second reference signal.

In one embodiment, the second transmitter 1601 transmits first information; the first information is used to indicate that the first signal is associated with the first reference signal, or the first information is used to indicate that the first signal is associated with the second reference signal.

In one embodiment, the second zone identifier and a first offset are used to determine the third zone identifier, the first offset relating to a distance between a first panel and a second panel; a first antenna port and a second antenna port are respectively associated with the first panel and the second panel.

In one embodiment, the second transmitter 1601 transmits a second signaling; the second signaling is used to indicate the first offset.

In one embodiment, the second transmitter 1601 transmits a target signal; the first signaling comprises configuration information for the target signal, the first signal being used for feedback for the target signal; the target signal is transmitted in a sidelink.

In one embodiment, the second receiver 1602 receives a third signaling; the third signaling is used to indicate a first zone size, the first zone size being used to determine a first zone identifier.

In one embodiment, the first zone size is used to determine at least the second zone identifier of the second zone identifier and the third zone identifier.

In one embodiment, the third signaling is used to indicate a second zone size, the second zone identifier being used to determine the third zone identifier.

In one embodiment, the second transmitter 1601 comprises at least the first four of the antenna 420, the transmitter 418, the multi-antenna transmitting processor 471, the transmitting processor 416 and the controller/processor 475 in Embodiment 4.

In one embodiment, the second receiver 1602 comprises at least the first four of the antenna 420, the receiver 418, the multi-antenna receiving processor 472, the receiving processor 470 and the controller/processor 475 in Embodiment 4.

Embodiment 17

Figure 17:
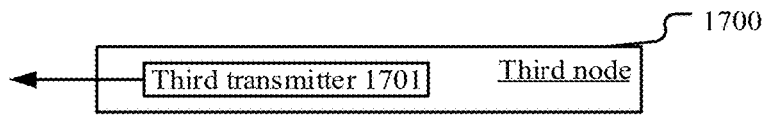
FIG. 17 illustrates a structure block diagram used in a third node according to one embodiment of the present disclosure.

Embodiment 17 illustrates a structure block diagram of a third node, as shown in FIG. 17. In FIG. 17, a third node 1700 comprises a third transmitter 1701.

The third transmitter 1701 transmits a third signaling.

In Embodiment 17, the third signaling is used to indicate a first zone size, the first zone size being used to determine a first zone identifier; a receiver for the third signaling includes at least a first node of the first node and a second node. the first node receives a first signaling, the first signaling being used to indicate the first zone identifier; the first node determines whether to transmit a first signal according to the first zone identifier and a target zone identifier; when the determination result is yes, transmits a first signal in a first radio resource set; when the determination result is no, drops a first signal transmission in a first radio resource set; when the first signal is associated with a first reference signal, the target zone identifier is a second zone identifier; when the first signal is associated with a second reference signal, the target zone identifier is a third zone identifier; the second zone identifier is different from the third zone identifier; the first zone size is used to determine at least the second zone identifier of the second zone identifier and the third zone identifier.

In one embodiment, the third signaling is used to indicate a second zone size, the second zone size being used to determine the third zone identifier.

In one embodiment, the third transmitter 1701 comprises at least the first four of the antenna 420, the transmitter 418, the multi-antenna transmitting processor 471, the transmitting processor 416 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, RSU, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling, the first signaling being used to indicate a first zone identifier; and
a first transmitter, determining whether to transmit a first signal according to the first zone identifier and a target zone identifier; when the determination result is yes, transmitting a first signal in a first radio resource set; when the determination result is no, dropping a first signal transmission in a first radio resource set;
wherein:
when the first signal is associated with a first reference signal, the target zone identifier is a second zone identifier; and
when the first signal is associated with a second reference signal, the target zone identifier is a third zone identifier; the second zone identifier being different from the third zone identifier, and the second zone identifier and a first offset relating to a distance between a first panel and a second panel being used to determine the third zone identifier, a first antenna port and a second antenna port respectively associated with the first panel and the second panel.

2. The first node according to claim 1, wherein the first transmitter transmits the first reference signal and the second reference signal.

3. The first node according to claim 1, wherein the first receiver receives the first reference signal and the second reference signal.

4. The first node according to claim 1, wherein the first receiver receives first information; the first information is used to indicate that the first signal is associated with the first reference signal, or the first information is used to indicate that the first signal is associated with the second reference signal.

5. The first node according to claim 1, wherein the first receiver receives a second signaling, the second signaling being used to indicate the first offset.

6. The first node according to claim 1, wherein the first receiver receives a target signal; the first signaling comprises configuration information for the target signal, the first signal being used for a feedback for the target signal; the target signal is transmitted in a sidelink.

7. The first node according to claim 1, wherein the first signal is associated with a first reference signal when the first signal and the first reference signal are QCL.

8. The first node according to claim 1, wherein the first signal is associated with a second reference signal when a transmission antenna port for the second reference signal and a transmission antenna port for the first signal are QCL.

9. The first node according to claim 1, wherein the first signaling and the first signal are both transmitted in a sidelink.

10. The first node according to claim 1, wherein the first zone identifier is a ZoneID; the second zone identifier is a ZoneID.

11. The first node according to claim 1, wherein the first node comprises the first panel and the second panel, the second zone identifier is used to indicate where the first panel is located, and the third zone identifier is used to indicate where the second panel is located.

12. The first node according to claim 1, wherein a first index is used to generate the first signal, the first index being a non-negative integer; a second index and a third index respectively correspond to the first panel and the second panel; when the first signal is associated with the first reference signal, the second index is used to generate the first signal; when the first signal is associated with the second reference signal, the third index is used to generate the first signal.

13. The first node according to claim 1, wherein the first node determines the first offset based on a distance between the first panel and the second panel; the first offset comprises a first horizontal offset and a first vertical offset; the first horizontal offset is used to determine a horizontal distance between the second panel and the first panel, and the first vertical offset is used to determine a vertical distance between the second panel and the first panel.

14. A first node for wireless communications, comprising:
a first receiver, receiving a first signaling, the first signaling being used to indicate a first zone identifier; and
a first transmitter, determining whether to transmit a first signal according to the first zone identifier and a target zone identifier; when the determination result is yes, transmitting a first signal in a first radio resource set; when the determination result is no, dropping a first signal transmission in a first radio resource set;
wherein:
when the first signal is associated with a first reference signal, the target zone identifier is a second zone identifier;
when the first signal is associated with a second reference signal, the target zone identifier is a third zone identifier; the second zone identifier being different from the third zone identifier; and
determining whether to transmit a first signal according to the first zone identifier and a target zone identifier comprises:
when the first signal is associated with the first reference signal, and the first zone identifier and the second zone identifier are jointly used to determine that a distance between a second node and the first node is no greater than a first threshold, the first node transmits the first signal in the first radio resource set; or
when the first signal is associated with the first reference signal, and the first zone identifier and the second zone identifier are jointly used to determine that a distance between a second node and the first node is greater than a first threshold, the first node drops transmitting the first signal in the first radio resource set; the second node is a transmitter for the first signaling.

15. A first node for wireless communications, comprising:
a first receiver, receiving a first signaling, the first signaling being used to indicate a first zone identifier; and
a first transmitter, determining whether to transmit a first signal according to the first zone identifier and a target zone identifier; when the determination result is yes, transmitting a first signal in a first radio resource set; when the determination result is no, dropping a first signal transmission in a first radio resource set;
wherein:
  when the first signal is associated with a first reference signal, the target zone identifier is a second zone identifier;
  when the first signal is associated with a second reference signal, the target zone identifier is a third zone identifier; the second zone identifier being different from the third zone identifier; and
  determining whether to transmit a first signal according to the first zone identifier and a target zone identifier comprises:
    when the first signal is associated with a second reference signal, and the first zone identifier and the third zone identifier are jointly used to determine that a distance between a second node and the first node is no greater than a first threshold, the first node transmits the first signal in the first radio resource set; or
    when the first signal is associated with a second reference signal, and the first zone identifier and the third zone identifier are jointly used to determine that a distance between a second node and the first node is greater than a first threshold, the first node drops transmitting the first signal in the first radio resource set; the second node is a transmitter for the first signaling.

16. A first node for wireless communications, comprising:
a first receiver, receiving a first signaling, the first signaling being used to indicate a first zone identifier; and
a first transmitter, determining whether to transmit a first signal according to the first zone identifier and a target zone identifier; when the determination result is yes, transmitting a first signal in a first radio resource set; when the determination result is no, dropping a first signal transmission in a first radio resource set;
wherein:
  when the first signal is associated with a first reference signal, the target zone identifier is a second zone identifier;
  when the first signal is associated with a second reference signal, the target zone identifier is a third zone identifier; the second zone identifier being different from the third zone identifier; and
  the first receiver receives a third signaling; the third signaling is used to indicate a first zone size, the first zone size being used to determine the first zone identifier, the first zone identifier being used to determine at least the second zone identifier of the second zone identifier and the third zone identifier; the first zone size comprises a first zone length and a first zone width, the first zone length being equal to X1 meters, and the first zone width being equal to Y1 meters, where X1 and Y1 are positive integers greater than 1.

17. A first node for wireless communications, comprising:
a first receiver, receiving a first signaling, the first signaling being used to indicate a first zone identifier; and
a first transmitter, determining whether to transmit a first signal according to the first zone identifier and a target zone identifier; when the determination result is yes, transmitting a first signal in a first radio resource set; when the determination result is no, dropping a first signal transmission in a first radio resource set;
wherein:
  when the first signal is associated with a first reference signal, the target zone identifier is a second zone identifier;
  when the first signal is associated with a second reference signal, the target zone identifier is a third zone identifier; the second zone identifier being different from the third zone identifier; and
  the first receiver receives a third signaling; the third signaling is used to indicate a second zone size, the second zone size being used to determine the third zone identifier; the second zone size comprises a second zone length and a second zone width, the second zone length being equal to X2 meters, and the second zone width being equal to Y2 meters, where X2 and Y2 are positive integers greater than 1.

* * * * *